United States Patent
Tanaka et al.

(10) Patent No.: US 7,400,810 B2
(45) Date of Patent: Jul. 15, 2008

(54) TOOL AND METHOD FOR ASSEMBLING LINEAR ELEMENTS INTO RIBBON SHAPE, AND LINEAR ELEMENTS ASSEMBLED INTO RIBBON SHAPE AND TERMINAL PORTION STRUCTURE OF THE SAME

(75) Inventors: Kousuke Tanaka, Tochigi (JP); Hiroyasu Sugiyama, Tochigi (JP); Shinsuke Niiyama, Kanagawa (JP); Kazuhiro Sato, Tochigi (JP); Tsuyoshi Ikada, Tochigi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/524,830

(22) PCT Filed: Aug. 20, 2003

(86) PCT No.: PCT/JP03/10495

§ 371 (c)(1),
(2), (4) Date: Feb. 18, 2005

(87) PCT Pub. No.: WO2004/019102

PCT Pub. Date: Mar. 4, 2004

(65) Prior Publication Data

US 2005/0271342 A1 Dec. 8, 2005

(30) Foreign Application Priority Data

Aug. 20, 2002 (JP) ............................... 2002-239719
Nov. 18, 2002 (JP) ............................... 2002-334126

(51) Int. Cl.
*G02B 6/00* (2006.01)
*G02B 6/44* (2006.01)

(52) U.S. Cl. ...................................... 385/134; 385/114

(58) Field of Classification Search ...................... None
See application file for complete search history.

(56) References Cited

U.S. PATENT DOCUMENTS 3,920,432 A * 11/1975 Smith ........................... 65/408

(Continued)

FOREIGN PATENT DOCUMENTS

CN 1251177 A 4/2000

(Continued)

OTHER PUBLICATIONS

US-1992-272771, Jul. 1992, Daini Shinano Polymer.*

(Continued)

*Primary Examiner*—Rodney Bovernick
*Assistant Examiner*—Chris Chu
(74) *Attorney, Agent, or Firm*—McDermott Will & Emery LLP

(57) ABSTRACT

A positioning of a plurality of optical fibers 11 is performed by a pair of position regulating members 12a and 12b. Then, the paired position regulating members 12a and 12b are moved along two guide members 13, 13 in such a manner as to have a predetermined distance therebetween. A ribbon support member 15 is placed between the paired position regulating members 12a and 12b in such a way as to support the optical fibers 11. The plurality of optical fibers 11 are held and fixed by the holding members 17a and 17b. Further, the plurality of optical fibers 11 put on the ribbon support member 15 are sandwiched by the ribbon support member 15 and the pressing tool 19 opposed thereto. In a terminal portion structure 110a of a ribbon fiber 10, terminal portions of optical fibers 102 are arranged horizontally in parallel, an adhesive tape is stuck onto at least one of upper and lower surfaces of at least the terminal portions.

4 Claims, 18 Drawing Sheets

U.S. PATENT DOCUMENTS

| | | | |
|---|---|---|---|
| 4,289,558 A | 9/1981 | Eichenbaum et al. | |
| 4,812,010 A * | 3/1989 | Osaka et al. | 385/96 |
| 6,295,400 B1 | 9/2001 | Shahid | |
| 6,560,395 B1 * | 5/2003 | Shahid | 385/137 |
| 6,655,433 B1 * | 12/2003 | Hirayama et al. | 156/436 |
| 2002/0054739 A1 * | 5/2002 | Kawase et al. | 385/59 |
| 2002/0094178 A1 * | 7/2002 | Matsumoto et al. | 385/115 |
| 2002/0142705 A1 * | 10/2002 | Sugiura | 451/41 |

FOREIGN PATENT DOCUMENTS

| | | |
|---|---|---|
| EP | 1 037 083 | 9/2000 |
| JP | 54-50342 | 4/1979 |
| JP | 54050342 A * | 4/1979 |
| JP | 55-9565 | 1/1980 |
| JP | 55-12231 | 1/1980 |
| JP | 1-227106 | 9/1989 |
| JP | 7-301715 | 11/1995 |
| JP | 8-54522 | 2/1996 |
| JP | 9-236733 | 9/1997 |
| WO | WO 98/41889 | 9/1998 |

OTHER PUBLICATIONS

Chinese Office Action issued in corresponding Chinese Patent Application No. CN 038195836, dated Nov. 3, 2006.

* cited by examiner

TOOL AND METHOD FOR ASSEMBLING LINEAR ELEMENTS INTO RIBBON SHAPE, AND LINEAR ELEMENTS ASSEMBLED INTO RIBBON SHAPE AND TERMINAL PORTION STRUCTURE OF THE SAME

TECHNICAL FIELD

The present invention relates to a tool and method for assembling linear elements (wire, fiber, cord) into a ribbon shape. The present invention also relates to linear elements assembled into a ribbon shape and a terminal portion structure of the same.

BACKGROUND ART

Among tools for assembling linear elements into a ribbon shape, there has been a tool for manufacturing an optical cord, which is partly assembled like a ribbon shape, by aligning a necessary number of optical fibers to be partly assembled into a ribbon shape, and then sticking an adhesive tape thereto and finally cutting off an unnecessary part (see, for example, "Simple Ribbonizing Tool (Fibrlok2670Multi-Fiber Ribbon Construction Tool)", November 1998, edited by 3M Company).

Meanwhile, in the simple ribbonizing tool, alignable length depends upon the length (about 50 mm) thereof. Thus, this related-art tool has a drawback in that when the length of a part of the optical fibers, which needs aligning, is equal to or longer than the alignable length, a process similar to the aforementioned operation should be repeatedly performed, and that this is troublesome. Moreover, the related-art tool has another drawback in that when a plurality of optical fibers are aligned, the arranging pitch of the optical fibers depends upon the diameter thereof. Thus, the arranging pitch thereof cannot be arbitrarily set, and consequently, the flexibility in manufacturing a partially ribbon-like optical cord is low. Furthermore, the related-art tool has another drawback in that because optical fibers are partially assembled into a ribbon shape by usually using a flammable tape in the present circumstances, a resultant optical cord is weak against heat.

Further, as a method for assembling linear elements into a ribbon shape, there is a related-art method for assembling a plurality of optical fibers into a ribbon shape, by aligning the plurality of optical fibers to be partly assembled into a ribbon shape, applying a UV-curable resin on the plurality of optical fibers as a whole to integrate the plurality of optical fibers into one body, and irradiating the UV-curable resin with UV rays to solidify the UV-curable resin to thereby form like a ribbon shape.

There is also a related-art method including aligning a plurality of optical fibers to be partly assembled into a ribbon shape, and applying a rapid-cure resin on the plurality of optical fibers to solidify the rapid-cure resin in a short time to thereby integrally form like a ribbon shape.

As shown in FIG. 26A, in the case of use of the UV-curable resin 101 for producing a ribbon fiber 100, there is however a possibility that the UV-curable resin 101 may be solidified in the condition that the arrangement of optical fibers 102 is disordered by the pressure of the UV-curable resin 101 when the UV-curable resin 101 is applied on the optical fibers 102.

As shown in FIG. 26B, in the case of use of the rapid-cure resin 103 for producing a ribbon fiber 104, it is however a possibility that some optical fibers 102 may drop out when the ribbon fiber 104 is bent because the rapid-cure resin 103 cannot be applied too thick to obtain sufficient strength.

When, for example, coatings are removed from a terminal portion of the array of the optical fibers 102 by a jacket remover to attach a connector to the ribbon fiber 100 in the condition that the arrangement of the optical fibers 102 is disordered, there is a problem that a blade of the jacket remover strikes on and damages some optical fibers not located in proper positions. Or, when the optical fibers 102 are integrated into a ribbon shape by use of a UV-curable resin, there is a problem that the thickness of the ribbon fiber 100 may vary and that it may be impossible to remove the coatings completely. It is also difficult to form a ribbon fiber in which the pitch of arrangement of optical fibers varies locally.

The invention is accomplished in view of the drawbacks. Accordingly, a first object of the invention is to provide a tool for assembling linear elements into a ribbon shape, which is enabled to align a part of plural linear elements in a portion having a given length, and to fix the aligned linear elements in the form of a ribbon. A second object of the invention is to provide linear elements assembled into a ribbon shape and a terminal portion structure of the same so that coatings can be removed collectively by a jacket remover without damage of the linear elements.

DISCLOSURE OF INVENTION

To achieve the first object, according to a first aspect of the invention, there is provided a tool (hereunder referred to as a first tool of the invention) for assembling a plurality of linear elements into a ribbon shape by a ribbon construction material, which comprises a pair of regulating members enabled to regulate positions of the plurality of linear elements, a guide member for supporting each of the pair of regulating members in such a way as to enable the pair of regulating members to perform relative movement, and a ribbon support member enabled to be placed between the pair of regulating members.

In the tool configured in this manner, the alignment and positioning of the plurality of linear elements are performed by the pair of position regulating members. Then, the paired position regulating members are moved along the guide members in such a way as to have a predetermined distance therebetween. Then, the ribbon support member is placed between the pair of position regulating members, and supports the linear elements to which the ribbon construction material is supplied. Then, ribbon construction is performed.

In an embodiment (hereunder referred to as a second tool of the invention) of the first tool of the invention, the pair of regulating members have respectively a plurality of positioning grooves for positioning the linear elements, and an interval, at which the plurality of positioning grooves formed in one of the pair of regulating members, differs from an interval at which the plurality of positioning grooves formed in the other regulating members.

In the second tool configured in this manner, the interval, at which the positioning grooves are provided in one of the regulating members that are placed in such a way as to have a predetermined distance therebetween, differs from that at which the positioning grooves are provided in the other regulating member. Thus, the pitch of the linear elements to be assembled into a ribbon shape is changed by fitting the linear elements into the positioning grooves formed in both the regulating members.

According to a second aspect of the invention, there is provided a method (hereunder referred to as a first method of the invention) for assembling a plurality of linear elements into a ribbon shape by a ribbon construction material, which comprises the steps of regulating positions of the plurality of linear elements at a plurality of places, supplying said ribbon construction material to the plurality of linear elements, and fixing the plurality of linear elements and said ribbon construction material.

According to an embodiment of the first method of the invention, the linear elements and the ribbon construction material are fixed by pressing the ribbon construction material.

To achieve the second object, according to a third aspect of the invention, there is provided a terminal portion structure (hereunder referred to as a first terminal portion structure of the invention) of linear elements assembled into a ribbon shape, which comprises a terminal connection portion including terminal portions of the linear elements arranged horizontally in parallel to form a parallel linear element fiber set, and a film having an adhesive layer stuck onto at least one of upper and lower surfaces of at least the terminal portions of the parallel linear element set to integrate at least the terminal portions of the plurality of linear elements into a ribbon shape.

In the first terminal portion structure of the linear elements assembled into a ribbon shape configured as described above, because at least one film is stuck and fixed onto an linear element array by an adhesive layer in the condition the linear elements are positioned so as to be disposed in parallel, the linear elements can be fixed to proper positions respectively. Accordingly, when coatings need to be removed from a terminal of the linear elements assembled into a ribbon shape by a jacket remover, the coatings can be removed easily without damage of the linear elements by a blade of the jacket remover.

In an embodiment (hereunder referred to as a second terminal portion structure of the invention) of the first terminal portion structure of the invention, the terminal portion structure further comprises a connector attached to the terminal connection portion.

In the second terminal portion structure configured in this manner, because the liner members are fixed to proper positions respectively, when a connector is attached to the terminal of the linear elements assembled into a ribbon shape, coatings can be removed easily without damage of the linear elements and the connector can be attached thereto.

To achieve the second object, according to a fourth aspect of the invention, there is provided linear elements assembled into a ribbon shape (hereunder referred to as a first linear elements assembled into a ribbon shape of the invention), which comprises a spliced portion wherein a terminal connection portion of linear elements according to the first terminal portion structure is fusion-spliced to the other terminal connection portion of the other linear elements.

In the first linear elements assembled into a ribbon shape configured as described above, because the linear elements are fixed to proper positions respectively in the terminal connection portion, when coatings need to be removed from a terminal of the linear elements assembled into a ribbon shape, the coatings including the film can be removed easily without damage of the linear elements, and can be connected to the other linear elements so as to easily form the linear elements assembled into a ribbon shape with the spliced portion.

BEST MODE FOR CARRYING OUT THE INVENTION

Hereinafter, an embodiment of a tool for assembling linear elements into a ribbon shape is described in detail with reference to the accompanying drawings. Incidentally, in this embodiment of the invention, optical fibers are employed as an example of the linear elements and a tool for assembling the optical fibers into a ribbon shape will be explained.

Figure 1:
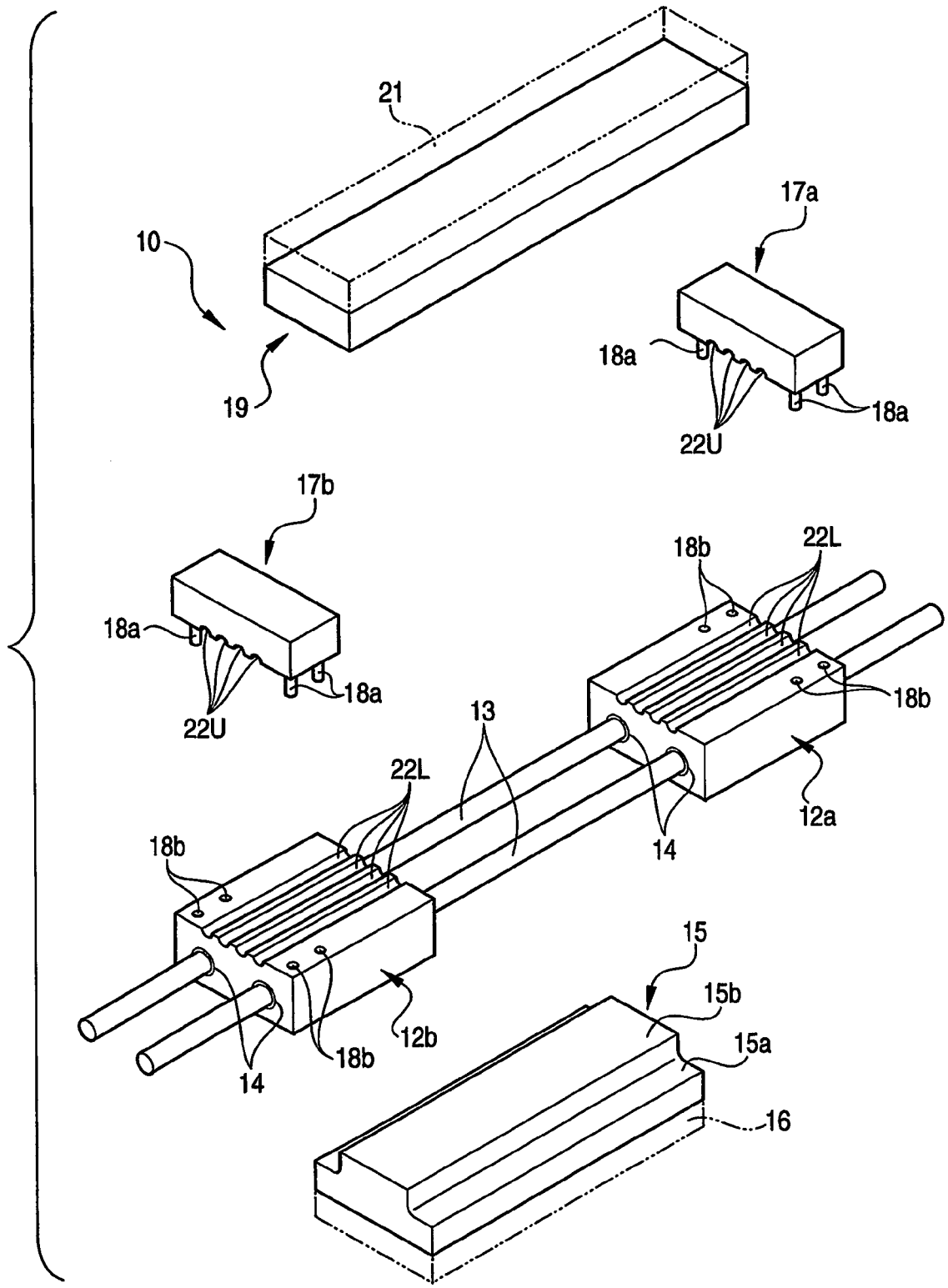
FIG. 1 is an exploded perspective view showing an embodiment of a tool for assembling optical fibers into a ribbon shape according to the invention.

FIG. 1 is an exploded perspective view showing each of constituent elements of the tool for ribbon construction. As shown in FIG. 1, a ribbon construction tool 10 is provided with a pair of regulating members 12a, 12a, which can regulate the position in a direction perpendicular to the longitudinal direction of the plurality of optical fibers 11 (see FIGS. 2A to 2D). Two guide members 13, 13 support the pair of regulating members 12a and 12b so that these regulating members can freely and relatively approach each other and come apart from each other in the longitudinal direction of the plurality of optical fibers 11. Incidentally, it is convenient to form the inside periphery of a sliding hole 14 of each of the regulating members 12a and 12b is made of rubber so that the regulating members 12a and 12b are fixed at predetermined positions in such a way as to be able to slide along the guide members 13 and 13.

The distance between both the regulating members 12a and 12b can be adjusted by moving the regulating members along the guide members 13, 13. Incidentally, it is preferable that each of the two guide members 13, 13 are fixed at an end thereof in such a way as not to move independent of each other.

A ribbon support member 15, which can be placed between the two guide members 13, 13, is provided between the pair of regulating members 12a and 12b. This ribbon support member 15 comprises a base portion 15a and a projection portion 15b, and has an inverse T-shaped section. The projection portion 15b can be fitted between the two guide members 13, 13. An end surface (that is, a top surface, as viewed in FIG. 1) of the projection portion 15b is a flat surface. Incidentally, in the case of using a thermosetting resin or a thermoplastic resin as the ribbon construction material, a heating means 16 can be provided on the ribbon support member 15. In the case of using UV-curable resin as the ribbon construction material, a UV-irradiating means (not shown) can be provided thereon.

Paired holding members 17a and 17b are provided at places opposed to both the regulating members 12a and 12b, respectively. Preferably, a set of the holding members 17a and 17b or a set of the regulating members 12a and 12b are provided with a projection 18a or a locking hole 18b or magnets in such a way as to be able to be positioned at predetermined places on the regulating members 12a and 12b, respectively.

A pressing tool 19 is provided at a place opposed to the ribbon support member 15. It is preferable to use the pressing tool 19, whose entire length is longer than that of the ribbon support member 15, so that both the ends of the pressing tool 19 abut against the top surfaces of the end portions of the regulating members 12a and 12b when the tool 19 is put on the ribbon support member 15. Consequently, the plurality of optical fibers 11 to be assembled into a ribbon shape can be held in such a manner as to extend in the longitudinal direction thereof like straight lines. A heating means 21 may be provided on the pressing tool 19 according to a tape or resin used as the ribbon construction material.

A plurality of positioning grooves 22L for positioning the plurality of optical fibers 11 are formed at predetermined intervals in the top surface portions of the pair of regulating members 12a and 12b. As shown in FIG. 1, the plurality of (in this case, 4) positioning grooves 22L are formed at equal intervals in the top surface portions of both the regulating members 12a and 12b. Also, positioning grooves 22U, 22U are formed in the pair of holding members 17a and 17b.

An operation of assembling the optical fibers 11 into a ribbon shape by using the aforementioned ribbon construction tool 10 is described hereinbelow by referring to FIGS. 2A to 3.

Figure 2A:
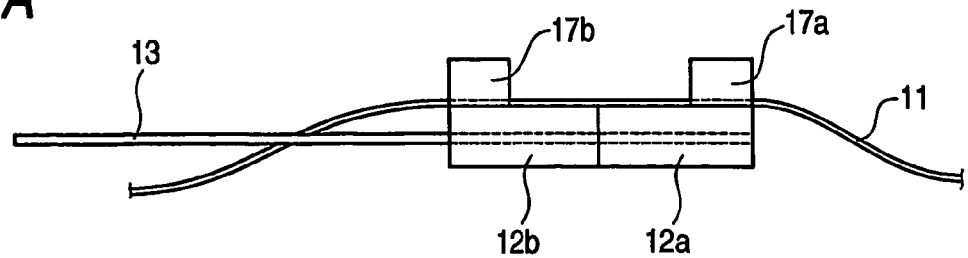
FIGS. 2A to 2D are front views showing a process of assembling optical fibers into a ribbon shape according to the invention.

Referring first to FIG. 2A, the plurality of optical fibers 11 are put on the pair of regulating members 12a and 12b placed closely together. In the case where the positioning grooves 22L are provided on the top surface portions of the regulating members 12a and 12b, the positioning of the optical fibers 11 is performed by fitting the fibers 11 into the positioning grooves 22L, respectively. The optical fibers 11 positioned on the regulating members 12a and 12b are sandwiched between the holding members 17a, 17b and the regulating members 12a and 12b. In the case that the positioning grooves 22U are provided in the bottom surface portions of the holding members 17a and 17b, the optical fibers 11 are fitted into the positioning grooves 22U. Alternatively, in the case that the projection 18a, the locking hole 18b or the magnets are provided for positioning the optical fibers 11 on a set of the holding members 17a, 17b and a set of the regulating members 12a, 12b, the positioning of these members is performed by using such means, so that both the sets of the members are fixed.

Figure 2B:
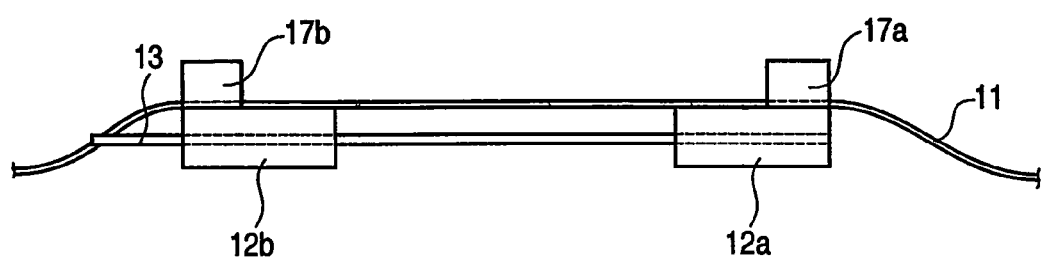

As shown in FIG. 2B, the pair of regulating members 12a and 12b, to which the holding members 17a and 17b are respectively fixed, are moved a predetermined distance by being slid along the guide members 13, 13. At that time, the optical fibers 11 are sandwiched between the holding members 17a, 17b and the regulating members 12a, 12b. However, when the pair of regulating members 12a and 12b are moved, the optical fibers 11 slide in the positioning groves 22U and 22L. Consequently, both the regulating members 12a and 12b can be moved. Incidentally, when the optical fibers 11 slide in the positioning grooves 22U and 22L, there is a certain friction. Therefore, the optical fibers 11 can be maintained in a state in which the fibers 11 are stretched by a tensile force of a predetermined magnitude.

Figure 2C:
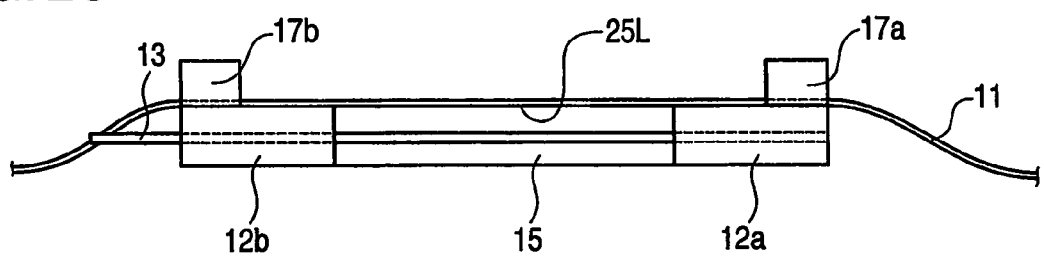

As shown in FIG. 2C, a thermal fusion bonding tape 25L serving as a ribbon construction material to be bonded to lower surfaces of the optical fibers 11 (hereinafter referred as lower thermal fusion bonding tape 25L) is put on the ribbon support member 15. Then, the ribbon support member 15 is fitted between both the regulating members 12a and 12b. At that time, the projection portion 15b of the ribbon support member 15 is inserted between the two guide members 13, 13. Consequently, as shown in FIG. 3, the lower thermal fusion bonding tape 25L put on the projection portion 15b of the ribbon support member 15 comes in contact with the optical fibers 11 during a state in which the tape 25L is stretched. The lower thermal fusion bonding tape 25L is fixed between the ribbon support member and each of the two guide members 13, 13.

Figure 2D:
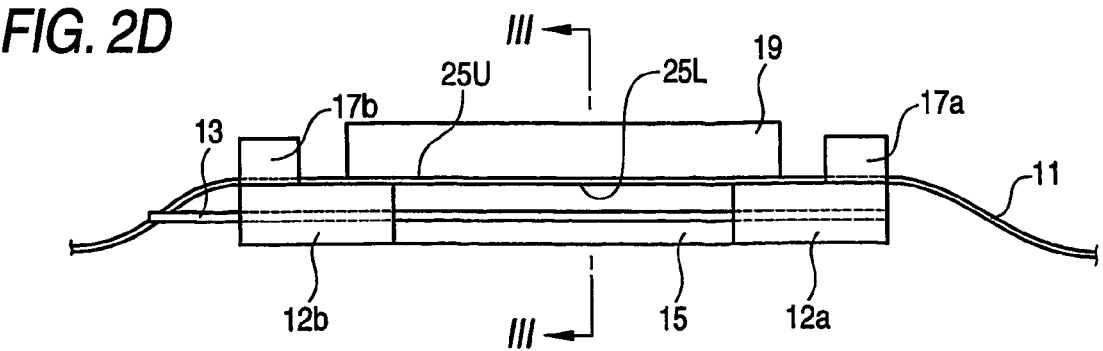

As shown in FIG. 2D, a thermal fusion bonding tape 25U serving as a ribbon construction material to be bonded to upper surfaces of the optical fibers 11 (hereinafter referred as upper thermal fusion bonding tape 25U) is put on the optical fibers 11 that are supported by the projection portion 15b of the ribbon support member 15. Subsequently, the pressing tool 19 is put thereon. Then, the optical fibers 11 are sandwiched between the pressing tool 19 and the ribbon support member 15. Consequently, as illustrated in FIG. 3, the optical fibers 11 are sandwiched between the upper thermal fusion bonding tape 25U and the lower thermal fusion bonding tape 25L.

Then, the thermal fusion bonding tape 25U, 25L are heated by the heating means 16 and 21. Thus, the plurality of optical fibers 11 are integrated like a ribbon. In the case that the heating means 16 and 21 are provided on, for example, the pressing tool 19 and the ribbon support member 15, both the thermal fusion bonding tapes 25L and 25U can easily be heated at a time.

Figure 4:
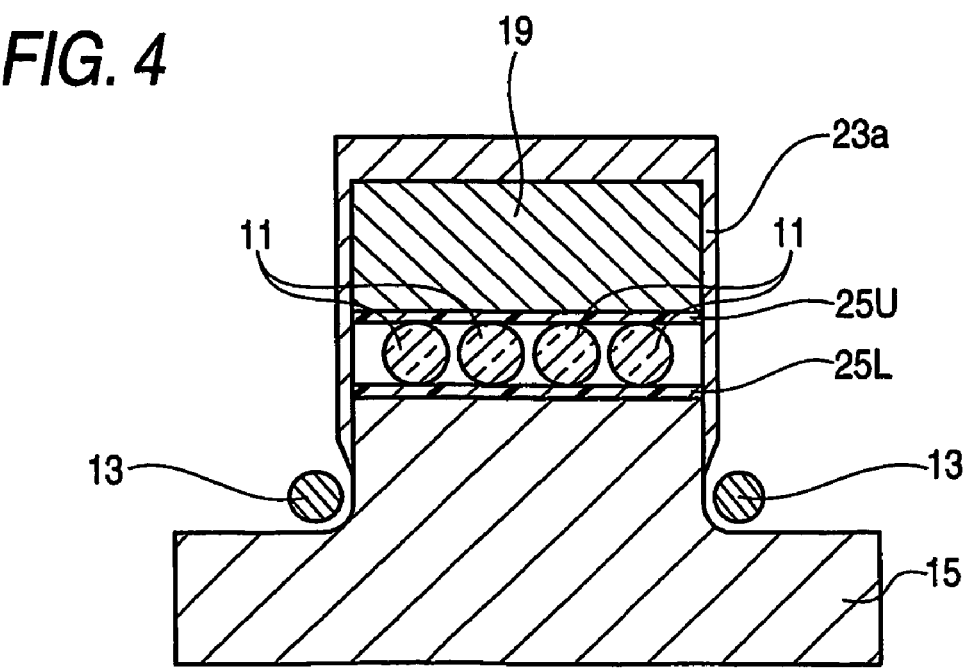
FIG. 4 is a sectional view showing a state in which a thermal fusion bonding tape is cut by a cutting blade.

Unnecessary parts of both the thermal fusion bonding tapes 25U and 25L are cut off by using a cutting blade 23a as shown in FIG. 4. The cutting blade 23a can reach a part of a side surface of the ribbon support member 15 by being pushed from above the pressing tool 19. Consequently, the unnecessary parts of both the thermal fusion bonding tapes 25U and 25L are cut off, so that the operation of assembling the optical fibers into a ribbon shape is completed. A short blade, which has a length in the longitudinal direction shorter than that of the portion assembled into a ribbon shape, may be used as the cutting blade 23a by being moved along the pressing tool 19 in the longitudinal direction thereof to thereby cut off the unnecessary parts. Alternatively, a long blade, which has a length in the longitudinal direction longer than that of the portion assembled into a ribbon shape, may be used as the cutting blade 23a by being pushed from above the pressing tool 19 to thereby cut off the unnecessary parts collectively.

Figure 5:
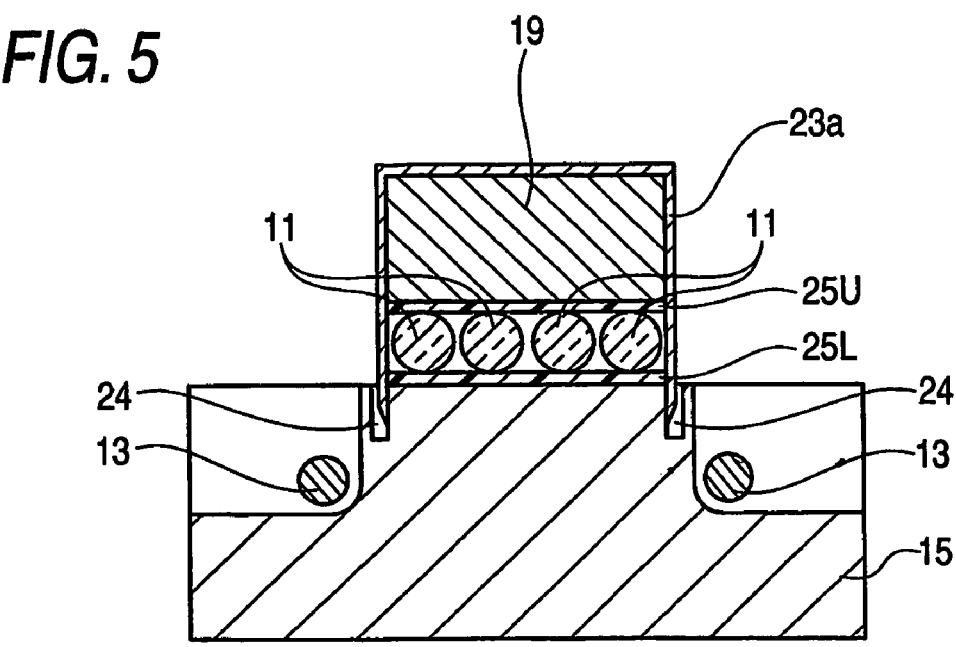
FIG. 5 is a sectional view showing a state in which a thermal fusion bonding tape is cut by a cutting blade.

According to another cutting mode, as illustrated in FIG. 5, grooves 24, 24 are formed o the top surface of the projection portion 15b of the ribbon support member 15. Then, the cutting blade 23a is pushed from above the pressing tool 19. Subsequently, a tip end of the cutting blade 23a is made to reach the grooves 24, 24. Thus, the remaining parts of both the thermal fusion tapes 25U and 25L can be cut off.

Figure 6A:
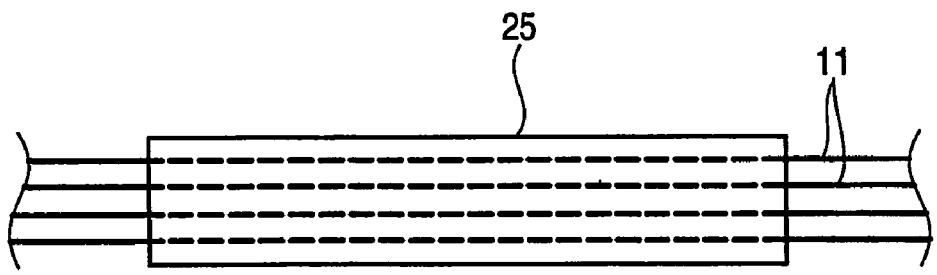
FIG. 6A is a plan view showing a state in which middle portions of the optical fibers are assembled into a ribbon shape.
Figure 6B:
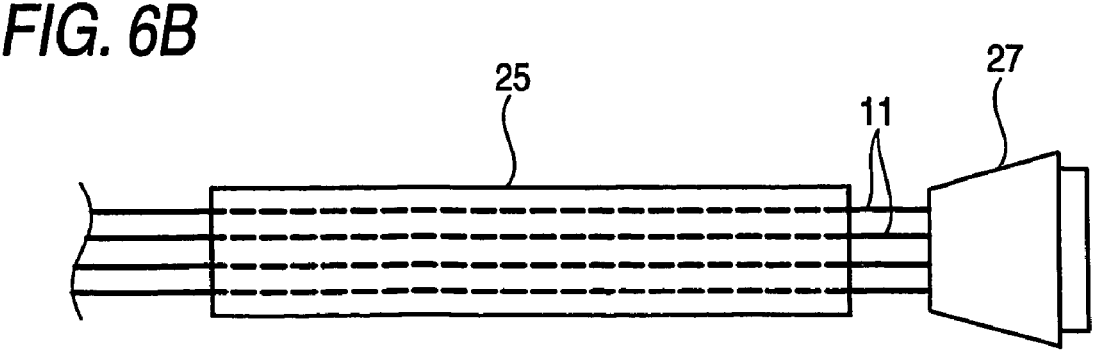
FIG. 6B is a plan view showing a state in which end portions of the optical fibers, which respectively adjoin ends thereof, are assembled into a ribbon shape.
Figure 7A:
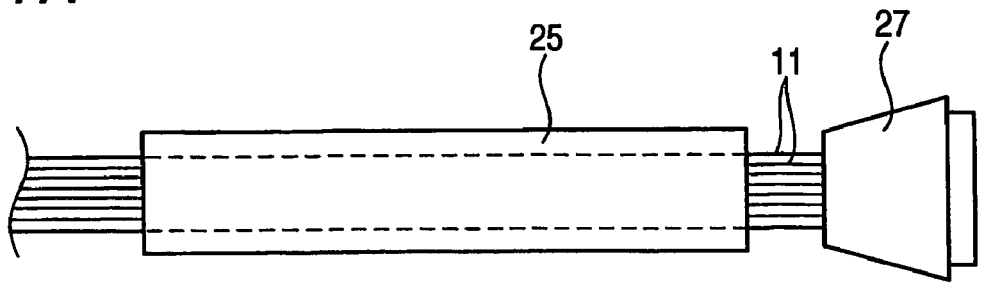
FIG. 7A is a plan view showing a state in which long end portions of the optical fibers, which respectively adjoin ends thereof, are assembled into a ribbon shape.
Figure 7B:
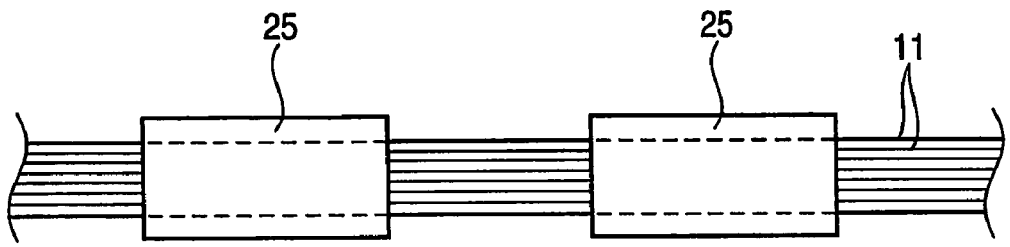
FIG. 7B is a plan view showing a state in which middle portions of the optical fibers are assembled into ribbon shapes at predetermined intervals.

As described above, according to this ribbon construction tool 10, the optical fibers 11 can easily be integrated and assembled into a ribbon shape of a desired length by setting the regulating members 12a and 12b in such a way as to be away by a desired distance from each other Additionally, the ribbon construction using the thermal fusion bonding tapes 25U and 25L can be applied to a middle portion of a set of optical fibers, as illustrated in FIG. 6A. As shown in FIG. 6B, the ribbon construction using the thermal fusion bonding tapes 25U and 25L may be applied to a part adjoining the end portion of each of the optical fibers 11, at which a connector 27 is provided. Besides, a region to be assembled into a ribbon shape can be lengthened as illustrated in FIG. 7A. Alternatively, short regions, each of which is assembled into a ribbon shape, can be provided at a predetermined interval, as shown in FIG. 7B.

EXAMPLE

A practical example is described hereinbelow. Eight secondary coated optical fibers 11 each having a diameter of 250 μm are used as the optical fibers 11, and fitted into the positioning grooves 22L formed in the regulating members 12a and 12b. The secondary coated optical fibers 11 are sandwiched between the holding members 17a, 17b and the regulating members 12a, 12b. Then, both the regulating members 12a and 12b are moved away about 100 mm from each other. Subsequently, the ribbon support member 15, on which the lower thermal fusion bonding tape 25L having a width of about 100 mm is put, is fitted between the regulating members 12a and 12b and between the guide members 13, 13 from below. Thus, the lower thermal fusion bonding tape 25L is tightly stretched by being pulled by the two guide members 13, 13. The upper thermal fusion bonding tape 25U covers the upper part of each of the secondary coated optical fibers 11. Then, the upper thermal fusion bonding tape 25U is heated by an iron serving as the heating means 21. Thus, the optical fibers 11 are assembled into a ribbon shape by using both the fusion bonding tapes 25U and 25L. Finally, the unnecessary parts of both the fusion bonding tapes 25U and 25L are cut off by the cutting blade 23. Consequently, the optical fibers can easily and reliably be assembled into a ribbon shape.

Figure 8:
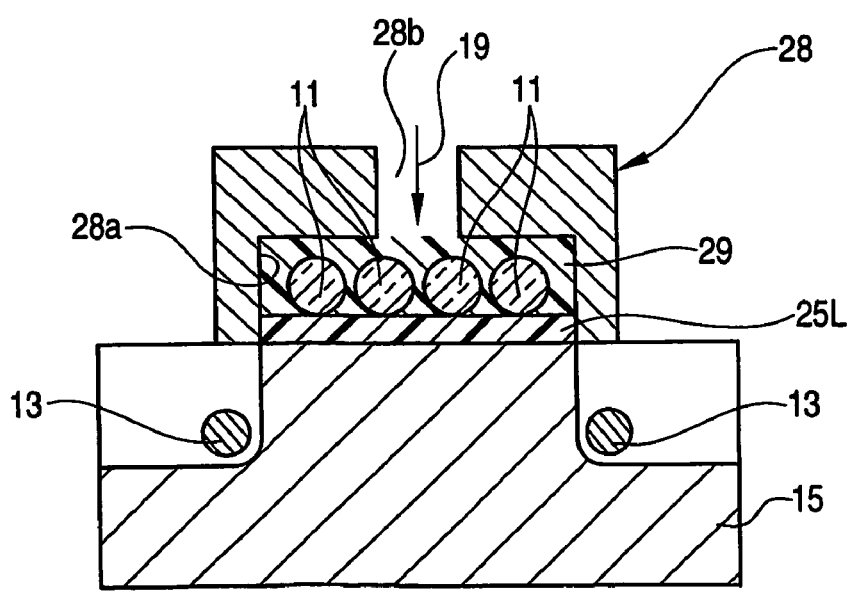
FIG. 8 is a sectional view showing a state in which optical fibers are assembled into a ribbon shape by a resin through the use of a die.

Next, a second embodiment of a tool for assembling the optical fibers into a ribbon shape according to the invention is described hereinbelow. The second embodiment uses a resin 29 for integrating and assembling the plurality of optical fibers 11 into a ribbon shape. Therefore, the second embodiment uses a die as shown in FIG. 8. This die 28 has an inner space 28a for accommodating the optical fibers 11 therein. The resin is supplied from a resin inlet 28b, which is provided in the upper portion, into the inner space 28a. Thus, the optical fibers 11 are integrated. A thermosetting resin and a UV-curable resin can be used as such a resin. Incidentally, in the case of using a thermosetting resin, a heating means is provided on the die 28. In the case of using a UV-curable resin, a UV-irradiating apparatus (not shown) is provided thereon. The remaining constituent elements are common to the first and second embodiments.

Even in the case of using the die 28, the optical fibers can easily and reliably be assembled into a ribbon shape having a desired length by moving the regulating members 12a and 12b away a desired distance from each other, similarly as in the aforementioned case. Further, in this embodiment, the lower fusion bonding tape 25L is applied to the optical fibers 11; however, the optical fibers 11 can be integrated into a ribbon shape by only the resin. Even in the case of using the UV-curable resin, according to the ribbon construction tool 10 of the invention, the optical fibers 11 can be integrated into a ribbon shape without being disordered by the pressure of UV-curable resin.

Figure 9A:
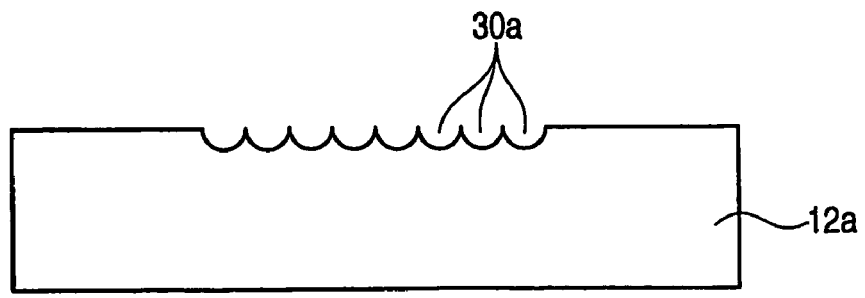
FIG. 9A is a front view showing a regulating member having successive positioning grooves.
Figure 9B:
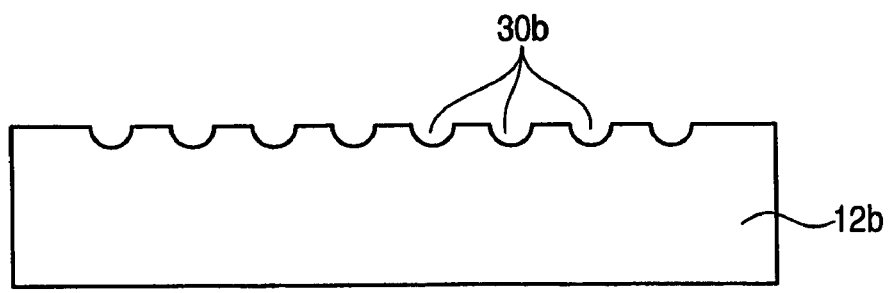
FIG. 9B is a front view showing a regulating member having positioning grooves provided at predetermined intervals.

Next, a third embodiment of a tool for assembling the optical fibers into a ribbon shape according to the invention is described hereinbelow. As illustrated in FIGS. 9A and 9B, the third embodiment differs from the aforementioned embodiments in the placement of the positioning grooves 30a and 30b provided in the top surface portions of the regulating members 12a and 12b. That is, although the positioning grooves 30a are successively formed in the regulating member 12a so that the adjacent optical fibers 11 are brought in contact with each other, the positioning grooves 30b are provided at a predetermined interval in the regulating member 12b so that the optical fibers 11 are arranged at a predetermined interval. The remaining constituent elements are common to the first and third embodiments. Therefore, the same constituent elements are designated by common reference character. The redundant descriptions of such constituent elements are omitted herein.

Figure 10:
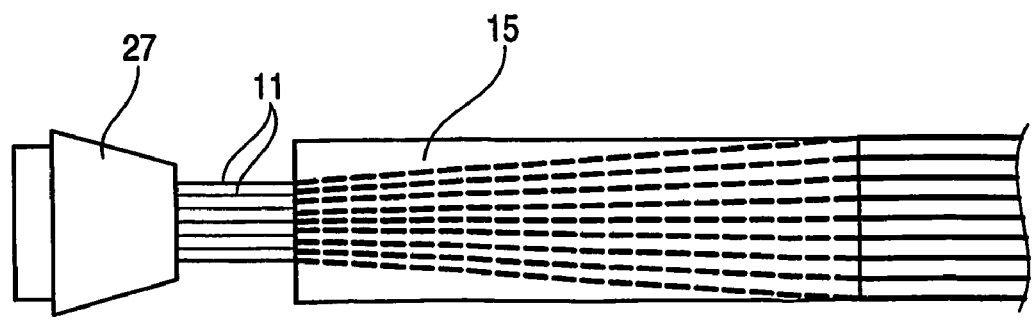
FIG. 10 is a plan view showing a state in which optical fibers are assembled into a ribbon shape so that the arranging pitch of the optical fibers at an end of the ribbon fiber differs from the pitch thereof at the other end of the ribbon fiber.

In the case of using such regulating members 12a and 12b, the optical fibers 11 positioned on both the members 12a and 12b extend radially on the ribbon support member 15, as shown in FIG. 10. That is, the interval between the adjacent ones of the optical fibers changes as the optical fibers 11 radiates.

Therefore, even when it is requested that the pitch of the optical fibers 11 to be assembled into a ribbon shape have different values at both ends of a portion of the fibers to be assembled into a ribbon shape, the optical fibers 11 can easily be assembled into a ribbon shape.

Figure 11A:
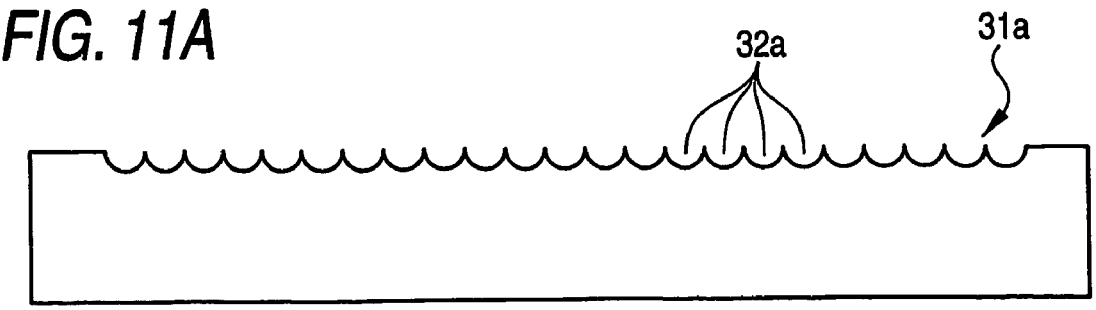
FIGS. 11A and 11B are front views showing a regulating member having many successive positioning grooves.
Figure 11B:
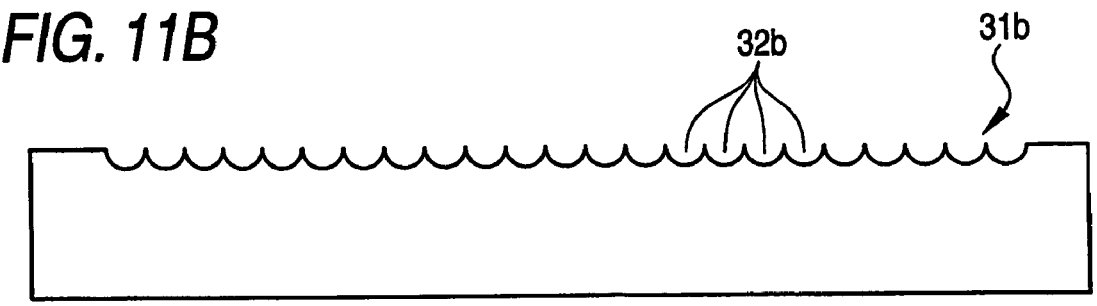

Incidentally, even when the regulating members 31a and 31b illustrated in FIGS. 11A and 11B are used, the optical fibers 11 can easily be assembled into a ribbon shape so that the pitches of the optical fibers 11 have different values at both ends of the portion of the fibers to be assembled into a ribbon shape, respectively.

In this case, both groups 32a and 32b of positioning grooves have many grooves successively provided in the regulating grooves 32a and 32b. Therefore, in the case that the optical fibers 11 are assembled into a ribbon shape during a state in which the adjacent optical fibers 11 are in contact with each other, the successive positioning grooves of the group 32a are used. In the case that the optical fibers 11 arranged at a predetermined interval are assembled into a ribbon shape, the positioning grooves to be used are selected from the group 32b at an interval of two grooves or three grooves. Thus, the optical fibers 11 can be assembled into a ribbon shape by employing various patterns thereof.

Figure 12A:
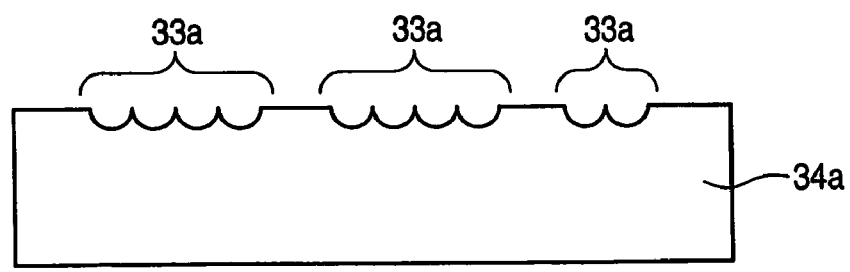
FIG. 12A is a front view showing a regulating member having grouped positioning grooves.
Figure 12B:
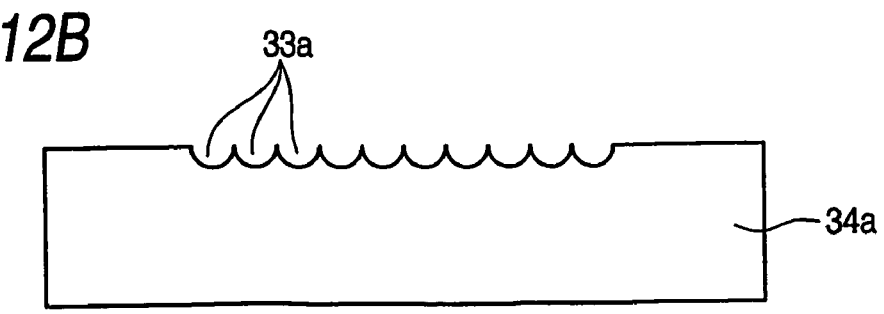
FIG. 12B is a front view showing a regulating member having successive positioning grooves.
Figure 13:
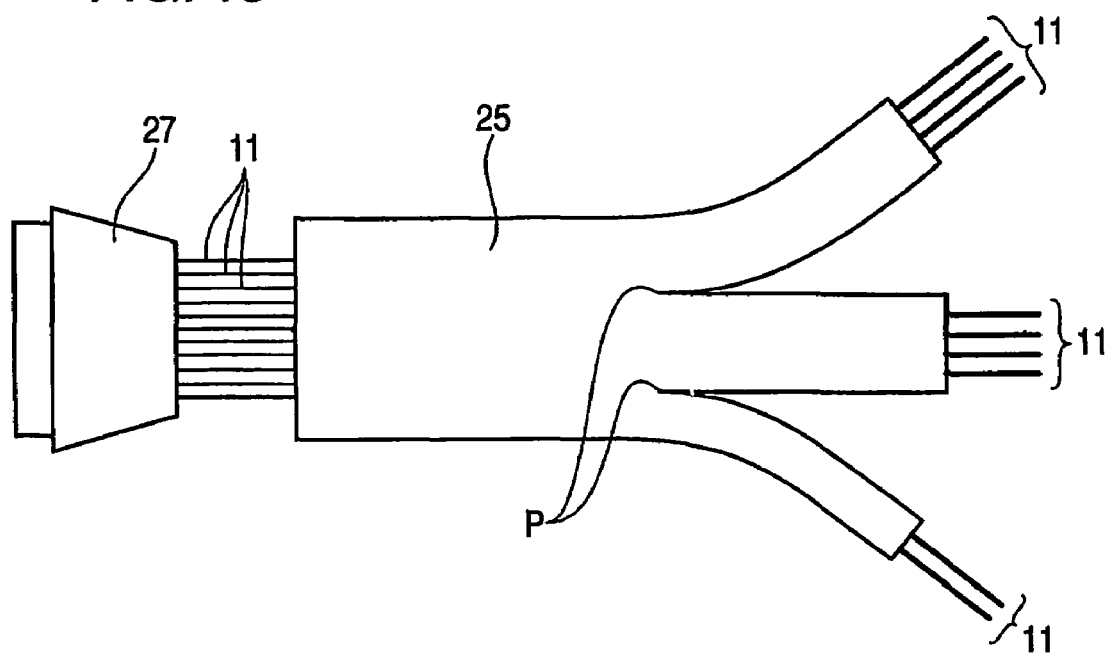
FIG. 13 is a plan view showing ribbon construction in which ten optical fibers are divided into a group of four optical fibers, another group of four optical fibers, and another group of two optical fibers.

In the case that the arrangement of the optical fibers 11 is determined, for example, as shown in FIGS. 12A and 12B in the case that ten optical fibers 11 are assembled into a ribbon shape by dividing the optical fibers 11 into a group of four optical fibers, another group of four optical fibers, and another group of two optical fibers, a regulating member 34b having successive positioning grooves 33a, similarly as the regulating member 31a, is used for fitting end portions of 10 optical fibers thereinto. A regulating member 34a having a group of four positioning grooves, another group of four positioning grooves, and another group of two positioning grooves, into which the positioning grooves 33a are divided, is used for fitting the other end portion of each of 10 optical fibers thereinto. Consequently, the optical fibers 11 extend like radiant rays on the ribbon support member 15. Thus, parts of the thermal fusion bonding sheet 25, which extend outwardly (that is, rightwardly, as viewed in FIG. 13) from a desired point P, are cut off. Consequently, ten optical fibers 11 can be assembled into a ribbon by dividing the optical fibers 11 into a group of four optical fibers, another group of four optical fibers, and another group of two optical fibers.

Figure 14:
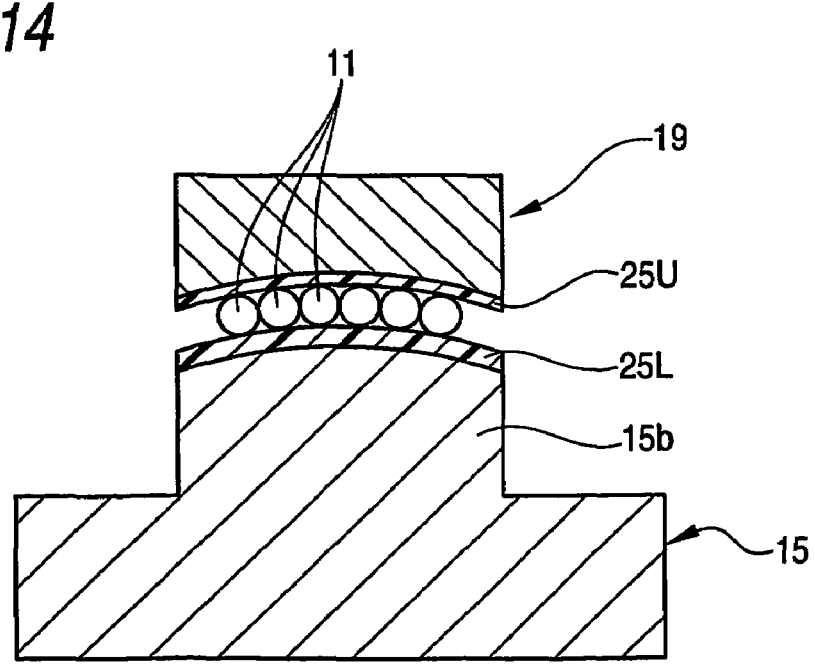
FIG. 14 is a sectional view showing a case that the opposed surfaces of a ribbon support member and a pressing jig have curved shapes.

Next, a fourth embodiment of a tool for assembling the optical fibers into a ribbon shape according to the invention is described hereinbelow. In the fourth embodiment, the top surface of the projection portion 15b of the ribbon support member 15 is a curved surface, as shown in FIG. 14. Moreover, the bottom surface of the pressing tool 19 is also a curved surface. A plurality of optical fibers 11 can be assembled into a ribbon shape, which is shaped like a curved surface, by using the ribbon support member 15 and the pressing tool 19. Therefore, the fourth embodiment is convenient in the case that optical fibers 11 assembled into a ribbon shape are used by being stacked in, for instance, an optical termination box.

Figure 15A:
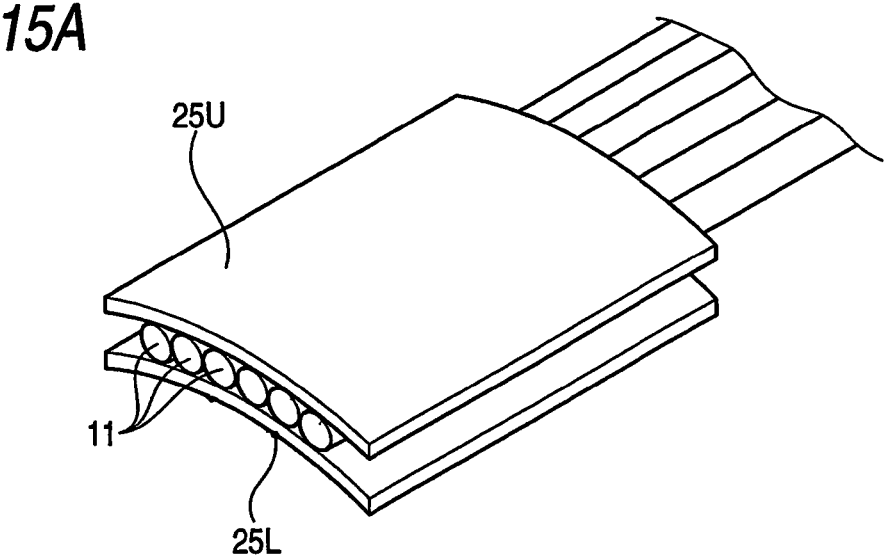
FIG. 15A is a perspective view showing a state in which optical fibers are assembled into a ribbon shape in such a way as to be successively arranged in a curve.
Figure 15B:
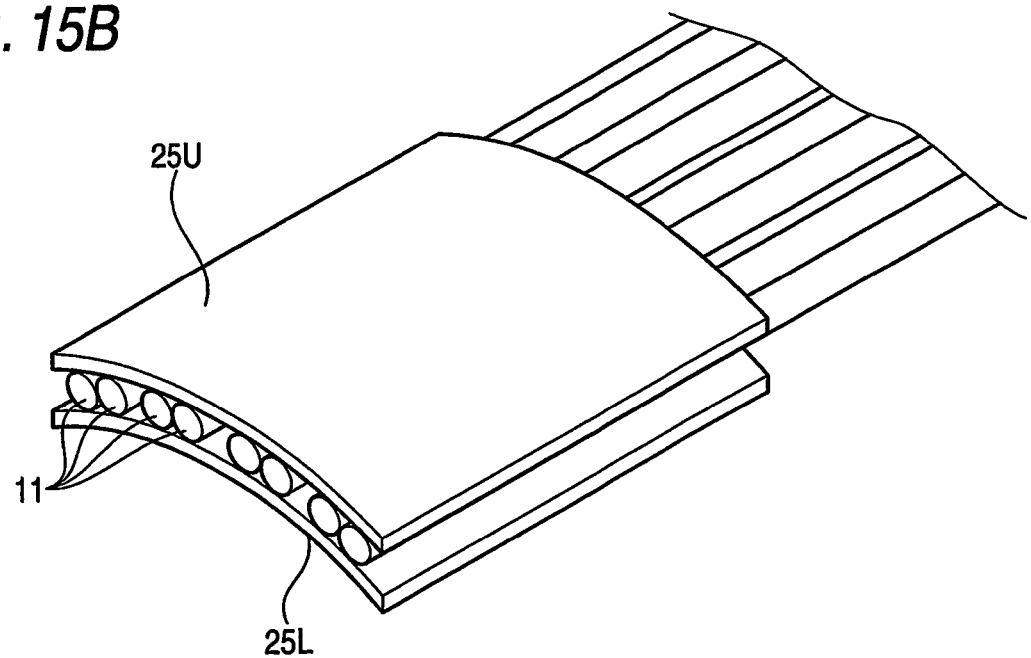
FIG. 15B is a perspective view showing a state in which optical fibers are assembled into a ribbon shape by being grouped.

Incidentally, even in the case of assembling optical fibers into a ribbon shaped like a curved surface, the arrangement of the optical fibers 11 can freely be selected, as illustrated in FIGS. 15A and 15B.

TABLE 1

| Number of cores | Pitch | Length | Material | Form | Other |
|---|---|---|---|---|---|
| 2 | Adjoining | 30 mm in the Shortest | Adhesive tape | Single | Continuous laminate tape |
| 4 | Predetermined interval | | Thermal fusion bonding tape | End of product | Intermittent laminate tape |
| 8 | Different at both ends | 100-500 mm being suitable range | | With connector | |
| 16 | Different pitches | | UV resin | Composite form of the above forms | Collective plurality |
| 32 | Composite form of the above forms | | Other resins | | Curved surface |
| . | | | | | |
| . | | | | | |
| . | | | | | |

TABLE 1 indicates summarized data relating to applicable cases. The number of the optical fibers 11 (that is, the number of cores) can be, for instance, 2, 4 (see FIGS. 1 to 6B, and 8), 8 (see FIGS. 7B, 9A, 9B to 13), 16, and 32.

The pitches of the optical fibers 11 are set in the case that the optical fibers adjoin each other (see FIGS. 6A to 7B), that the optical fibers are provided at a predetermined interval, that the optical fibers are provided at different pitches (see FIG. 15B), that the pitch of the optical fibers change at both the longitudinal ends thereof (see FIG. 10), that the optical fibers are divided into groups (see FIG. 13), and the like.

The length of the obtained ribbon fiber is about 30 mm at least. The suitable length of the ribbon fiber ranges from 100 mm to 500 mm.

Regarding materials to be used for ribbon construction, the simplest material is an adhesive tape. However, a thermal fusion bonding tape (see FIG. 3), a UV-curable resin, and other resins (see FIG. 8) may be used as the material to be used for ribbon construction.

Figure 16:
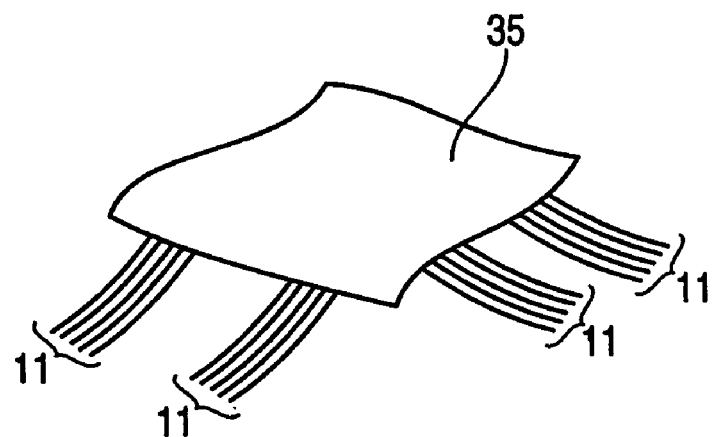
FIG. 16 is a perspective view showing a state in which optical fibers are assembled into a ribbon shape at an end portion of a product.
Figure 17:
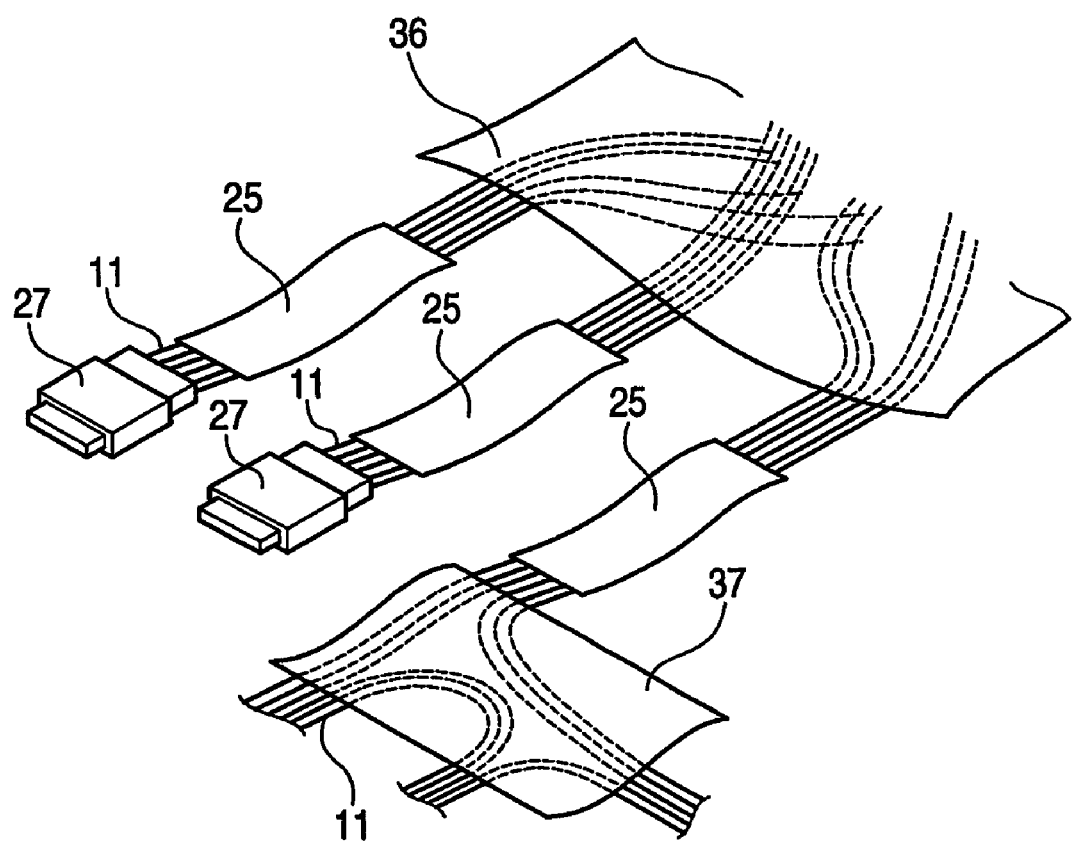
FIG. 17 is a perspective view showing a composite form.

The form of a ribbon to be formed can be a single form (see FIG. 6A), the form of an end of a product (see FIG. 16), the form of a ribbon with a connector (see FIG. 6B), and a composite form. The case of employing the form of an end of a product is, for example, that of assembling the optical fibers into a ribbon shape as preprocessing to be performed before a connector is attached to a terminal portion of a fiber sheet 35. An example of a composite form is shown in FIG. 17. That is, many optical fibers 11 are fixed at a fiber sheet 36 in such a manner that an end portion of each of optical fibers including extra length portion is pulled out from the fiber sheet 36. Then, the pulled-out end portions of the optical fibers are assembled into a ribbon shape by the ribbon construction tool 10 according to the invention. The optical fibers 11 assembled into the ribbon shape are connected to a connector 27, or branched. The branched portion is fixed to the other optical fibers 11, which are drawn from another direction, by a fiber sheet 37.

Additionally, a continuous laminate tape (that is, the optical fibers are integrated into a ribbon shape over the whole lengths thereof) or an intermittent laminate tape (that is, the short regions, each of which is assembled into a ribbon shape are provided at a predetermined interval) may be used as a ribbon construction material to be used for assembling the optical fibers into a ribbon shape. Further, regarding collective processing of a plurality of groups of optical fibers, the alignment and the ribbon construction are simultaneously performed for all groups when the optical fibers are divided into groups (see FIG. 13). The ribbon, into which the optical fibers 11 are assembled, may be shaped not only like a flat surface but also like a curved surface (see FIG. 14).

Incidentally, the above-mentioned tool for assembling linear elements into a ribbon shape according to the invention is not limited to the aforementioned embodiments. Appropriate modifications and improvements can be made. Furthermore, in the foregoing description of the aforementioned embodiments, it has been described that the optical fibers are employed as the linear elements. However, the linear elements are not limited to optical fibers. The invention can be applied to electric wires and cords.

Next, embodiments of a terminal portion structure of linear elements assembled into a ribbon shape according to the invention will be described below in detail with reference to the drawings. Incidentally, in embodiments of the invention, optical fibers are employed as an example of the linear elements and a terminal portion structure of ribbon fiber will be explained.

Figure 18A:
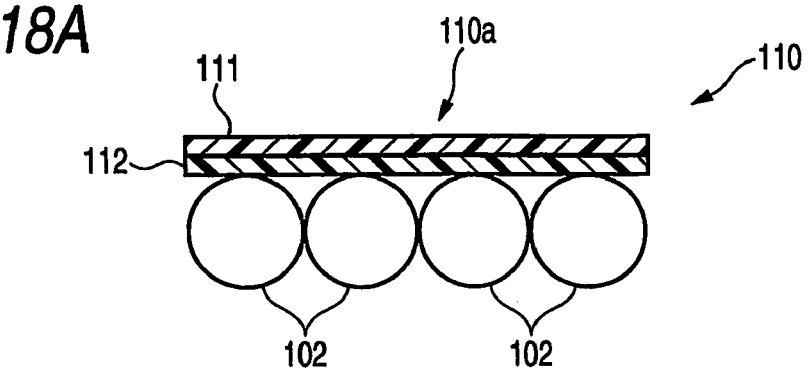
FIG. 18A is a sectional view showing a first embodiment of a terminal portion structure of a ribbon fiber in the case where a film is provided on one surface of an optical fiber array.
Figure 18B:
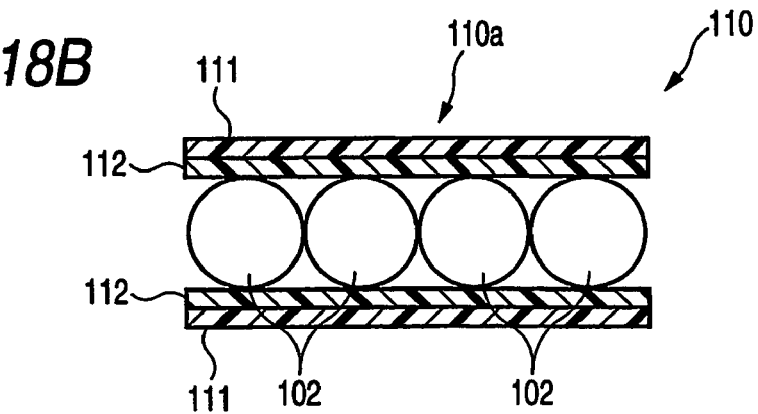
FIG. 18B is a sectional view showing a second embodiment of a terminal portion structure of a ribbon fiber in the case where films are provided on opposite upper and lower surfaces of the optical fiber array.

As shown in FIG. 18A or 18B, a terminal portion structure 110a of a ribbon fiber 110 according to an embodiment of the invention is formed in such a manner that at least terminal portions of a plurality of optical fibers (e.g., four optical fibers in this embodiment) 102 arranged in parallel at regular intervals are integrated into a ribbon shape by at least one film 111. Incidentally, one film 111 may be provided on one of upper and lower surfaces of the array of optical fibers 102 arranged in parallel as shown in FIG. 18A or two films 111 may be provided on the upper and lower surfaces of the array of optical fibers 102 respectively as shown in FIG. 11B. Herein, the film 111 includes a tape having a length necessary for ribbon construction or a tape cut by cutting means so as to have a length necessary for ribbon construction.

For example, PET (polyethylene terephthalate), nylon, or polyimide maybe used as the material of the film 111. An adhesive layer 112 is provided on the whole of one surface of the film 111. For example, an acrylic pressure-sensitive adhesive agent, a silicone pressure-sensitive adhesive agent, a rubber pressure-sensitive adhesive agent, or a thermoplastic adhesive agent may be used as the material of the adhesive layer 112.

The thickness of the film 111 is preferably selected to be in a range of from 12 μm to 100 μm. When, for example, a film made of PET is used and the thickness of the film is in an adequate range, an existing jacket remover can be used.

Figure 18C:
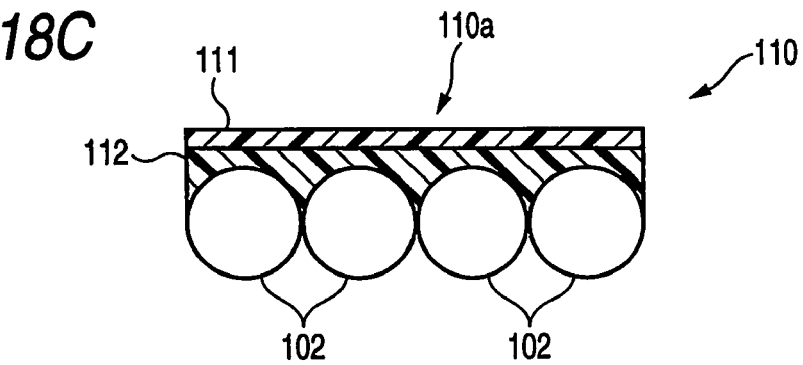
FIG. 18C is a sectional view showing a third embodiment of a terminal portion structure of a ribbon fiber in the case where a film is provided on one surface of the optical fiber array while a space between the film and the optical fiber array is filled with an adhesive layer.
Figure 18D:
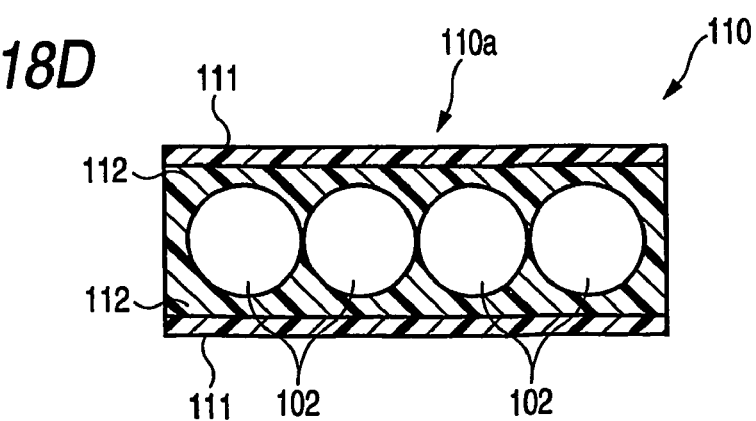
FIG. 18D is a sectional view showing a fourth embodiment of a terminal portion structure of a ribbon fiber in the case where films are provided on opposite upper and lower surfaces of the optical fiber array while a space between each film and the optical fiber array is filled with an adhesive layer.

In the configuration shown in FIG. 18C, a film 111 is disposed on one of upper and lower surfaces of the array of optical fibers 102 while a space between the film 111 and the array of optical fibers 102 is filled with an adhesive layer 112. In the configuration shown in FIG. 18D, two films 111 are disposed on upper and lower surfaces of the array of optical fibers 102 respectively while a space between each film 111 and the array of optical fibers 102 is filled with an adhesive layer 112. According to the configuration shown in FIG. 18C or 18D, facilitation of removing coatings from a terminal portion of the ribbon fiber can be improved more greatly.

An apparatus and method for producing a terminal portion structure 110a of a ribbon fiber 110 according to the invention will be described below.

Figure 3:
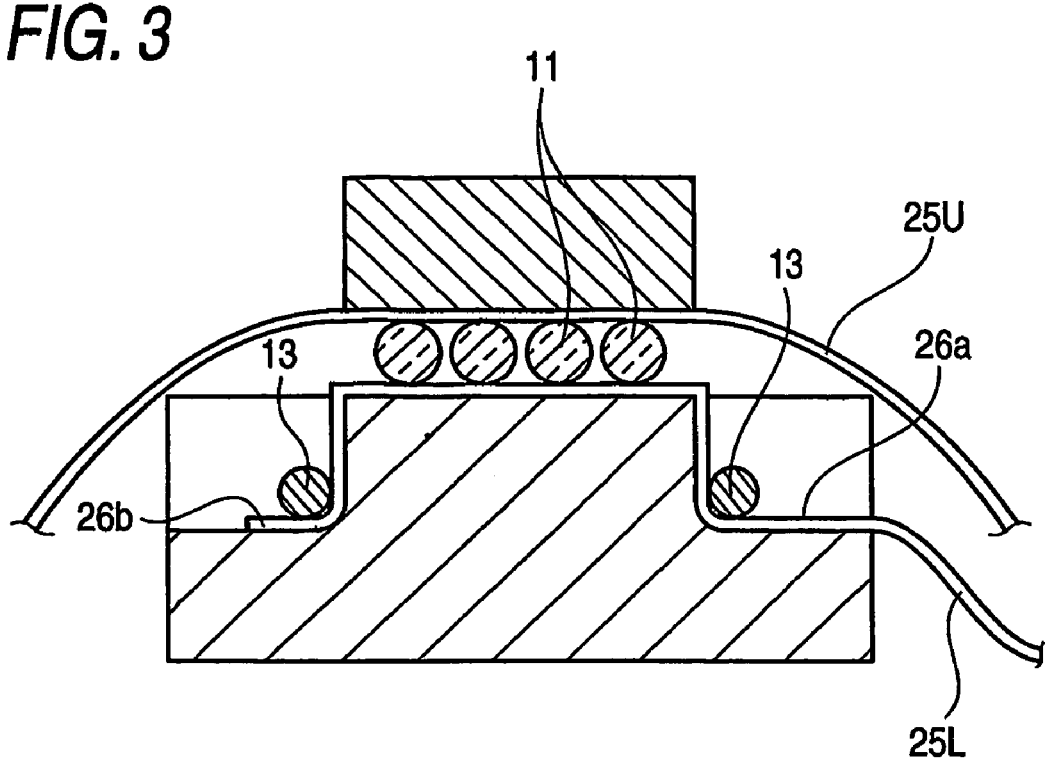
FIG. 3 is a sectional view taken along line III-III of FIG. 2D.
Figure 20:
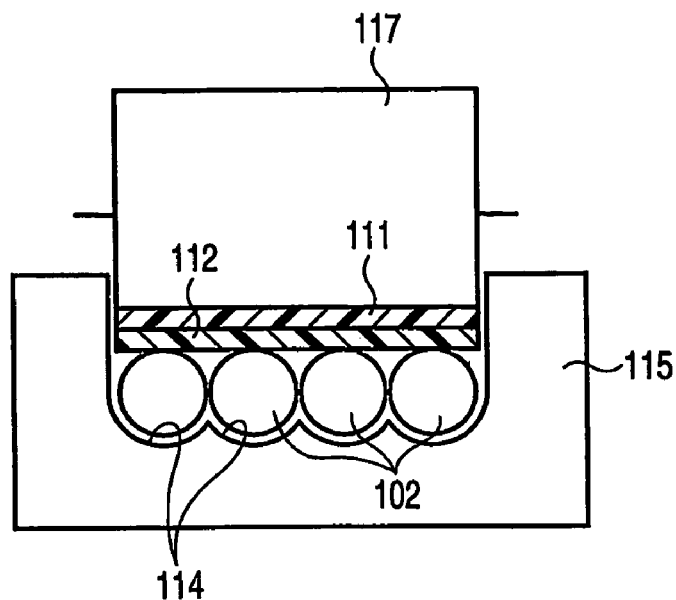
FIG. 20 is a sectional view taken along the line III-III in FIG. 19.

As shown in FIGS. 2 and 3, in an apparatus 113 for producing a terminal portion structure 110a of a ribbon fiber 110, there is provided an alignment jig 115 having alignment grooves 114 (see FIG. 20) for positioning four supplied optical fibers 102 at regular intervals. A film supply 116 is provided for supplying a film 111 in synchronism with supply of the optical fibers 102. The film 111 (provided with the adhesive layer 112) is supplied to the alignment jig 115 by the film supply 116. A press roller 117 is rotatably provided above the alignment jig 115 while the press roller 117 is pressed against the alignment jig 115.

Accordingly, the optical fibers 102 are supplied to predetermined positions along the alignment grooves 114 of the alignment jig 115. At the same time, the film 111 is supplied to the upper surface of the array of optical fibers 102 in the alignment jig 115 by the film supply 116. The film 111 and the optical fibers 102 are pressed by the press roller 17 from above the alignment jig 115, so that the optical fibers 102 are fixed while pressed against the adhesive layer 112 on the film 111 side. Incidentally, the place where the four optical fibers 102 are integrated into a ribbon shape by the film 111 may be only near the terminal or the film 111 may be used on the whole lengths of the four optical fibers 102.

Figure 21:
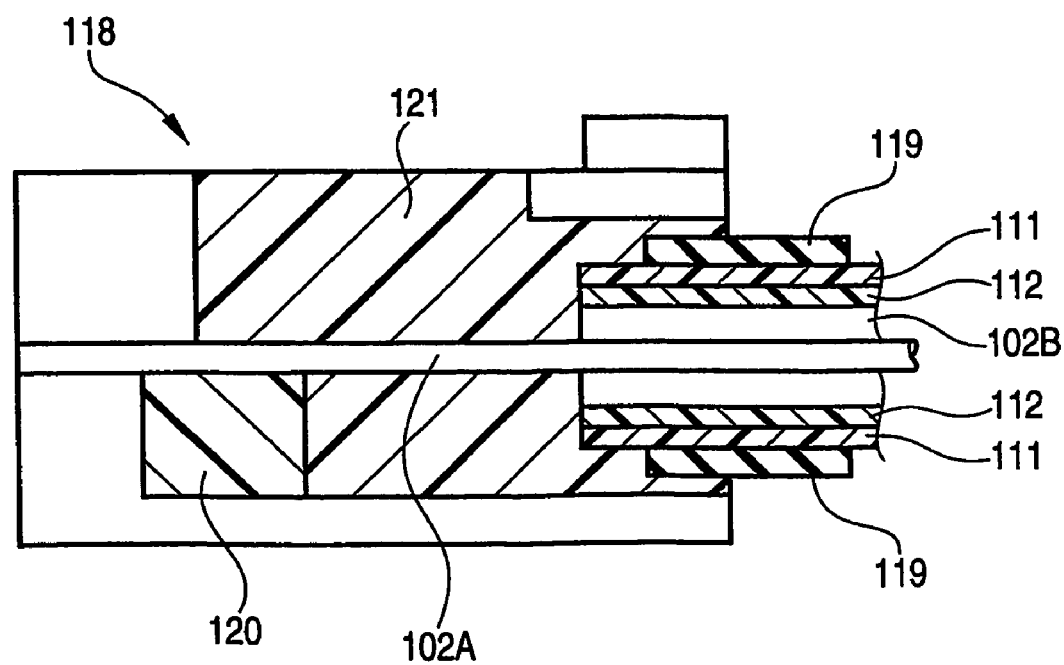
FIG. 21 is a sectional view showing a state in which a connector is attached to a terminal portion of a ribbon fiber.

FIG. 21 shows a state in which a connector 118 is attached to the terminal portion of the ribbon fiber 110 produced in the aforementioned manner. Coatings 102B of the optical fibers 102, films 111 and adhesive layers 112 are removed from the terminal portion of the ribbon fiber 110, so that fiber glass cores 102A are exposed. The fiber glass cores 102A are disposed, through rubber boots 119, in predetermined positions based on positioning grooves provided in a positioning block 120 in the inside of the connector 118. In this condition, an adhesive agent 121 is supplied into the positioning block 120 to thereby attach the connector 118 to the terminal portion of the ribbon fiber 110.

Figure 22A:
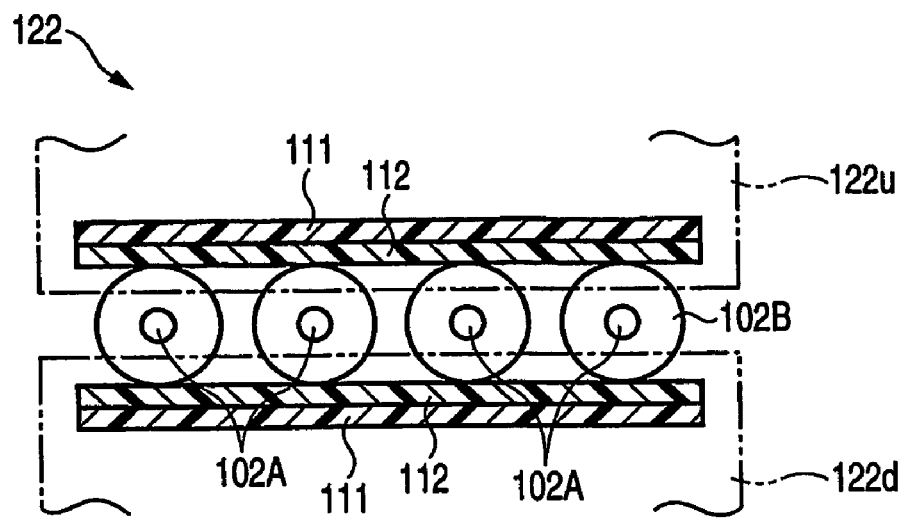
FIG. 22A a sectional view showing a state in which coatings are removed from a terminal portion of a ribbon fiber by a jacket remover, the ribbon fiber assembled in such a manner that opposite surfaces of an optical fiber array are coated with films respectively.
Figure 22B:
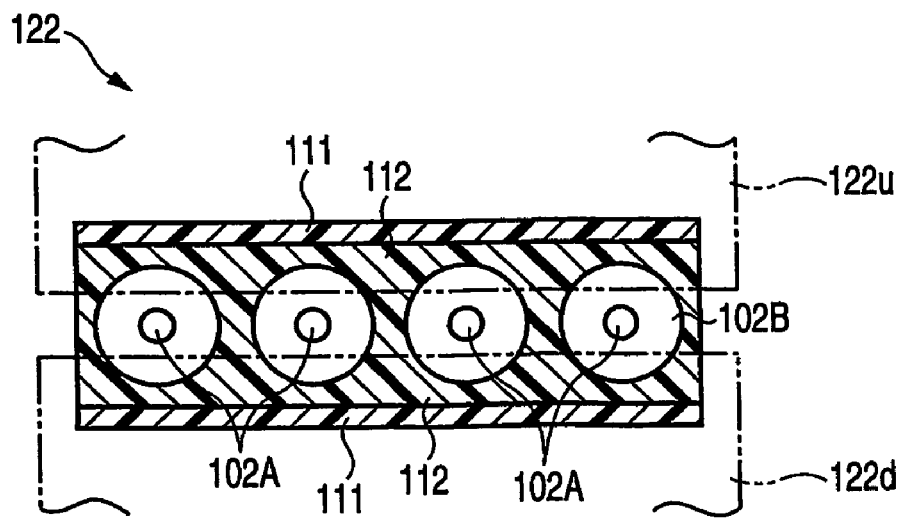
FIG. 22B a sectional view showing a state in which coatings are removed from a terminal portion of a ribbon fiber by a jacket remover, the ribbon fiber assembled in such a manner that opposite surfaces of an optical fiber array are coated with films respectively while a space between each film and the optical fiber array is filled with an adhesive layer.

For attachment of the connector 118, the coatings 102B, the films 111 and the adhesive layers 112 are removed from the terminal portion of the ribbon fiber 110 by a heated jacket remover 122 (see FIGS. 22A and 22B). On this occasion, in the terminal portion structure 110a of the ribbon fiber, the optical fibers 102 are retained in predetermined positions surely while kept at regular intervals. Accordingly, as shown in FIG. 22A, upper and lower blades 122u and 122d provided at a predetermined distance from each other in the jacket remover 121 are located so as to avoid the fiber glass cores 102A of the optical fibers 102. Accordingly, the coatings 102B, the films 111 and the adhesive layers 112 can be removed without damage of the fiber glass cores 102A. In addition, because the ribbon fiber 110 is retained constantly without any change in the direction of the thickness thereof, the coatings 102B, the films 111 and the adhesive layers 112 can be removed completely.

In the configuration shown in FIG. 22B, there is shown a state in which part of a ribbon fiber 110 formed in such a manner that a space between each film 111 and the array of optical fibers 102 is filled with an adhesive layer 112 is removed by a jacket remover 122. According to this configuration, facilitation of removing part of the terminal portion of the ribbon fiber can be improved more greatly.

Figure 23:
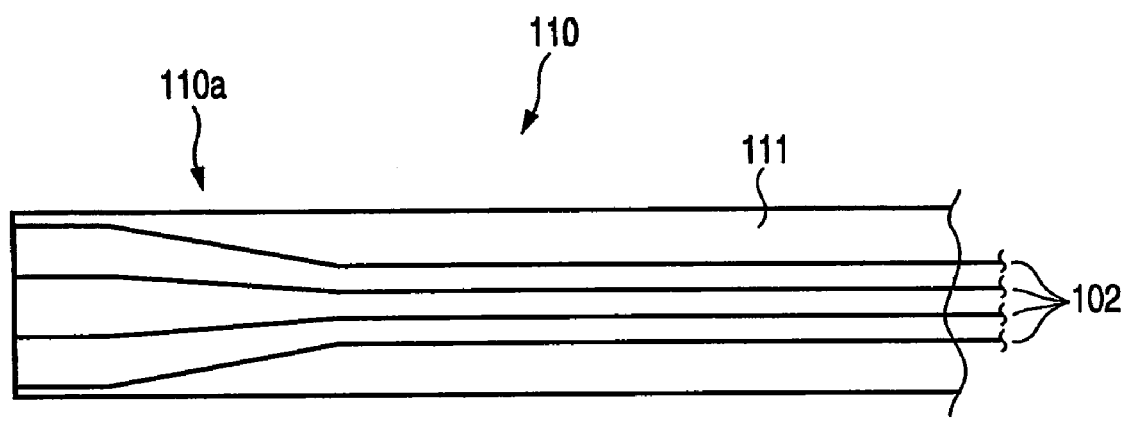
FIG. 23 is a plan view showing a state in which the pitch of arrangement of the optical fibers is changed at a terminal portion of a ribbon fiber.

Incidentally, for attachment of the connector 118, because the pitch of arrangement of the optical fibers 102 can be changed optionally, the connector 118 maybe attached to the terminal portion of the ribbon fiber, for example, in the condition that pitch of arrangement of the optical fibers 102 is changed according to the kind of the connector 118 so that the pitch at one end of the ribbon fiber is different from the pitch at the other end of the ribbon fiber as shown in FIG. 23. In this case, for example, by using the above-mentioned tool for ribbon construction, the arrangement of the optical fibers can be changed easily to various forms according to the kind of the connector 118.

Figure 24:
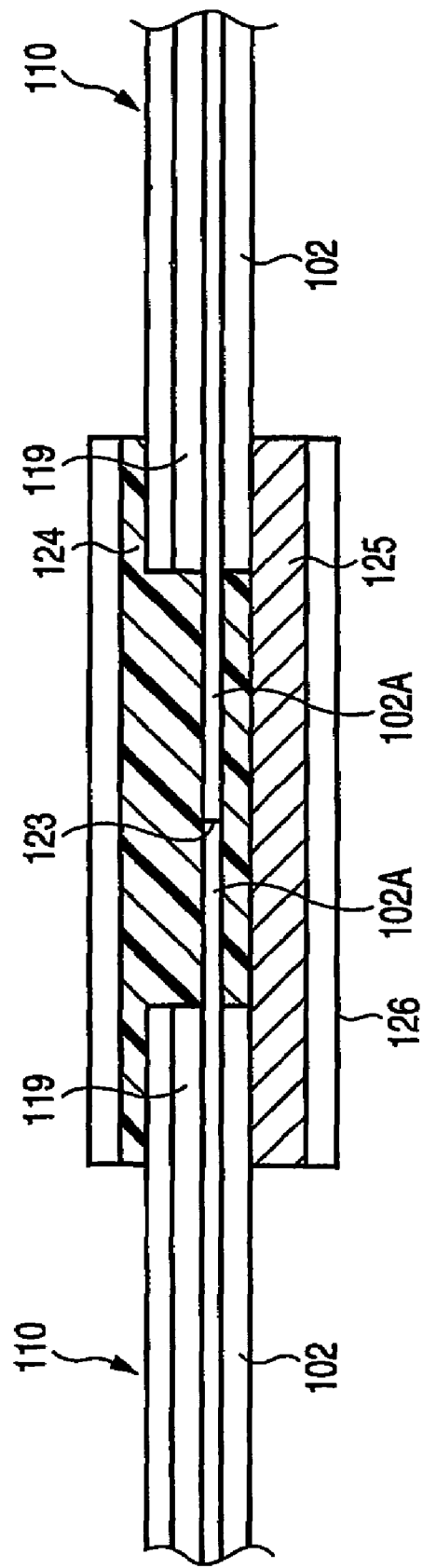
FIG. 24 is a sectional view showing a state in which an optical fiber array in a ribbon fiber is fusion-spliced to the other optical fiber array.

FIG. 24 shows a state in which the terminal portion of the ribbon fiber 110 produced in the aforementioned manner is fusion-spliced to the other array of optical fibers 102. That is, the strength of a neighbor of a fusion-splicing portion 123 is reduced remarkably because coatings 19 are removed so that respective fiber glass cores 102A, 102A of the two optical fiber arrays 102, 102 are exposed. Therefore, the fiber glass cores 102A, 102A are bonded to a reinforcing member 125 by a hot melt adhesive agent 124 and integrated with the reinforcing member 125 by a shrinkable tube 126 in order to protect and reinforce the fiber glass cores 102A, 102A.

According to the terminal portion structure 110a of the ribbon fiber, the films 111 is stuck and fixed onto at least one of opposite surfaces of the array of optical fibers 102 by the adhesive layers 112 in the condition that the optical fibers 102 are positioned so as to be disposed in parallel. Accordingly, the optical fibers 102 can be fixed in proper positions respectively. For this reason, when the coatings 119 need to be removed from a terminal portion of the ribbon fiber 110 by the jacket remover 122, the coatings 119 can be removed easily without damage of the optical fibers 102 by the blades 122u and 122d. Accordingly, the connector 118 can be attached to the terminal portion of the ribbon fiber 110 easily. In addition, two ribbon fibers 110 can be fusion-spliced to each other easily.

TABLE 2

|  | UV-curable resin | Quick-curable resin | Adhesive tape |
| --- | --- | --- | --- |
| Tact time | 15 minutes X | 2-3 minutes ○ | 5 minutes ○ |
| Pitch accuracy | Δ | ○ | ○ |
| Arrangement | Δ | Δ | ○ |
| Flatness | Δ | X | ○ |

TABLE 2 shows comparison of the invention with the case where the related-art UV-curable resin is used and with the case where the related-art quick-curable resin is used. That is, production time (tact time) in the terminal portion structure 110a of the ribbon fiber 110 used in the invention is 5 minutes which is relatively short whereas production time in the case where the UV-curable resin is used is 15 minutes. It is also obvious that the pitch accuracy of the optical fibers 102 in the ribbon fiber 110 is high compared with that in the case where the UV-curable resin is used. Both arrangement and variation in the direction of the thickness of the ribbon fiber 110 (flatness) are improved satisfactorily compared with the case where the UV-curable resin or the quick-curable resin is used.

Incidentally, the terminal portion structure 110a of the ribbon fiber according to the invention is not limited to the embodiments and changes, modifications, etc. may be made suitably.

Although the embodiments have been described on a four-core ribbon fiber 110 having four optical fibers 102, the invention is not limited thereto. For example, the invention maybe applied to an eight-core ribbon fiber a twelve-core ribbon fiber in the same manner as described above.

Although the embodiments have been described on the case where a film 111 is provided on only an upper surface of the array of optical fibers 102 and integrated with the array of optical fibers 102 into a ribbon shape to produce a ribbon fiber 110 the same function and effect can be obtained in the case where films 111 are provided on opposite upper and lower surfaces of the array of optical fibers 102.

Figure 19:
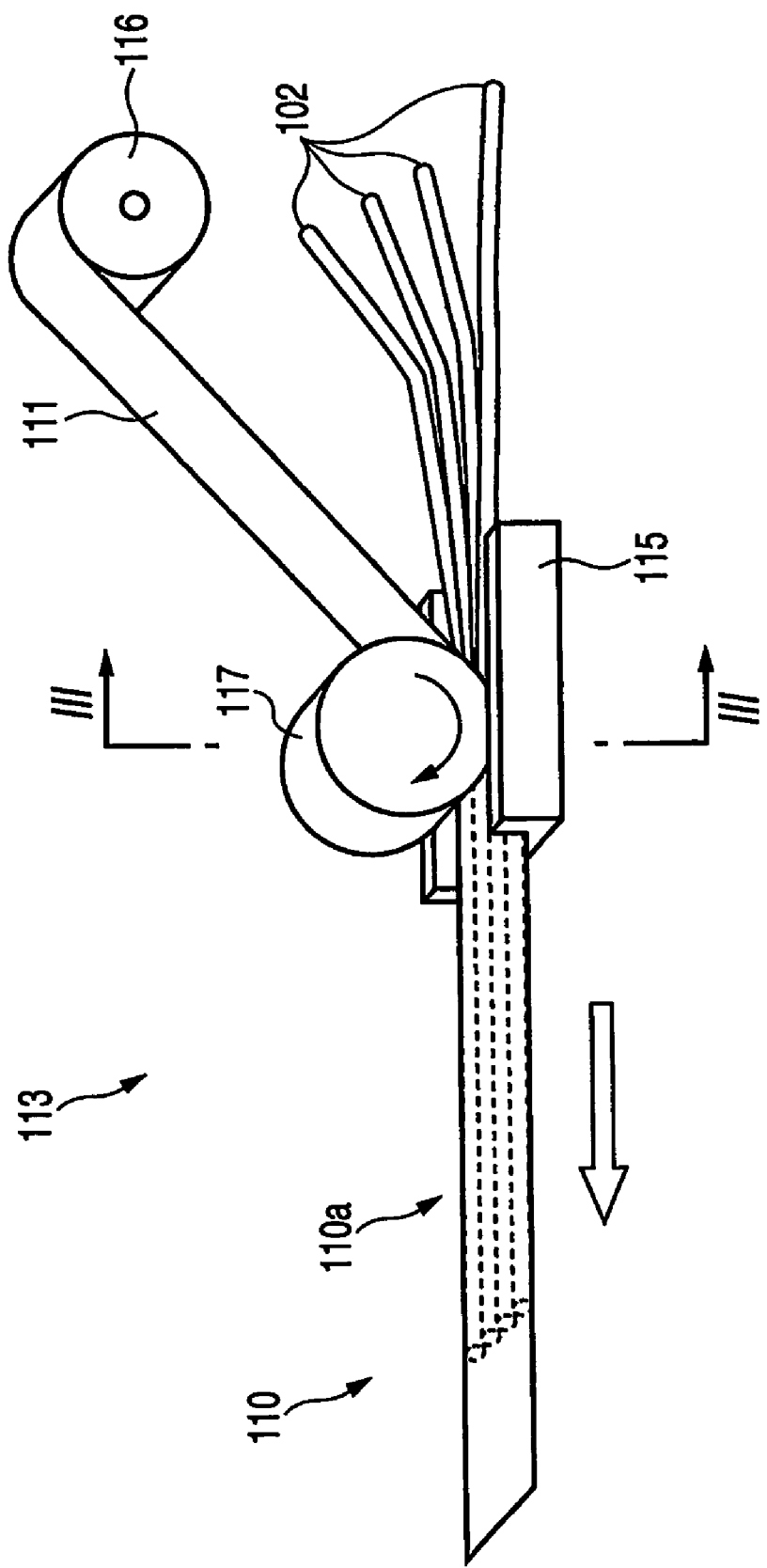
FIG. 19 is a perspective view showing an apparatus and a method for producing a terminal portion structure of a ribbon fiber according to the invention.
Figure 25:
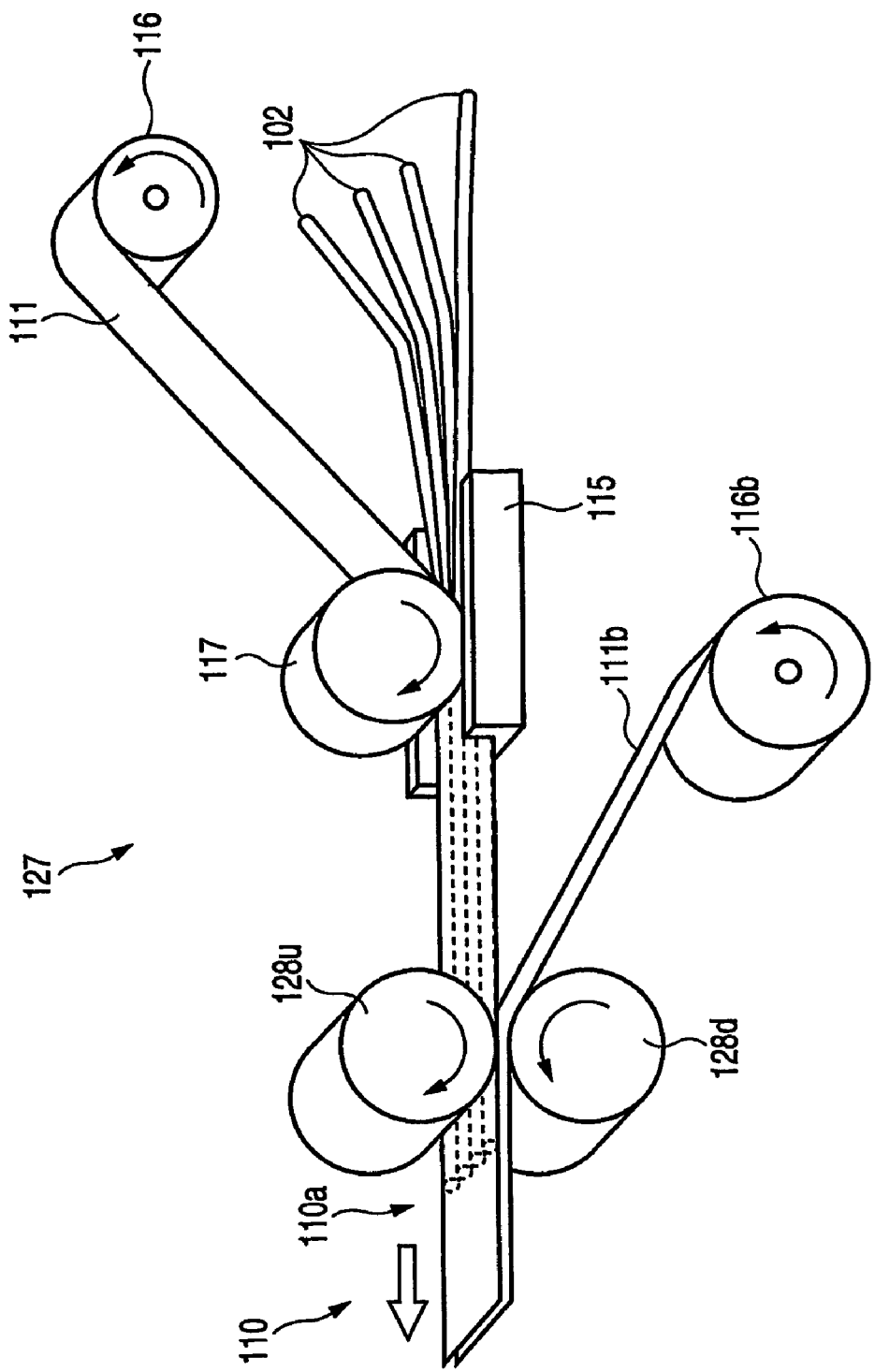
FIG. 25 is a perspective view showing an apparatus for producing a terminal portion structure of a ribbon fiber by sticking films onto opposite upper and lower surfaces of an optical fiber array.
Figure 26A:
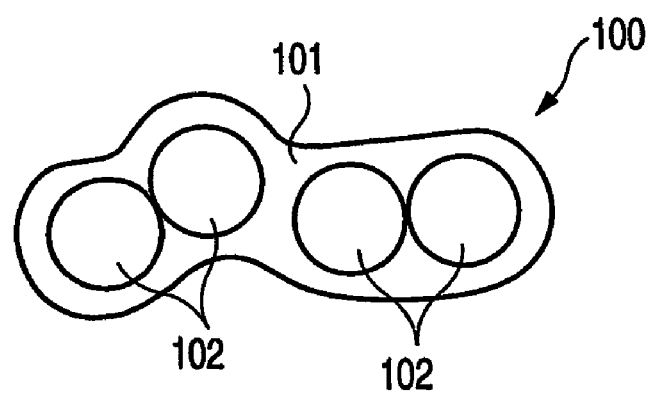
FIGS. 26A and 26B are sectional views showing problems in the related art.
Figure 26B:
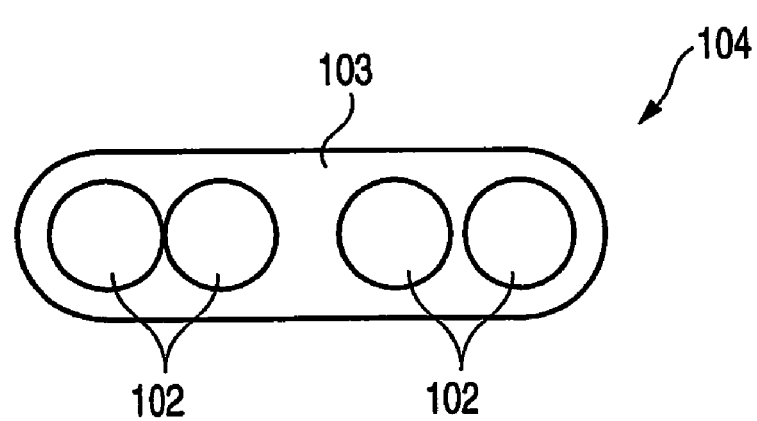

In this case, a producing apparatus 127 as shown in FIG. 25 is used. Incidentally, parts common to those of the producing apparatus 113 shown in FIG. 19 are denoted to by reference numerals the same as those of the producing apparatus 113 in FIG. 19 for the sake of omission of duplicated description.

That is, a pair of upper and lower press rollers 128u and 128d are rotatably provided on the downstream side (left in FIG. 25) of the alignment jig 115. A lower film supply 116b is provided for supplying a film 11b into between the pair of press rollers 128u and 128d so that the lower surface of the array of optical fibers 102 is covered with the film 111b. In this manner, there is produced a terminal portion structure 110a of a ribbon fiber 110 having the films 111 and 111b stuck onto the opposite upper and lower surfaces of the array of optical fibers 102 respectively as shown in FIG. 18B.

When a colored transparent film is used as the film 111 the optical fibers 102 can be distinguished from one another by eye observation. When different colors are used, a plurality of ribbon fibers can be discriminated from one another. As a result, a mistaken operation can be prevented. Furthermore, because the film 111 per se can be marked, discrimination can be made easily.

When a film with slits provided at regular intervals is used as the film 111 the optical fibers 102 can be easily separated from one another as well as the strength of the array of optical fibers 102 can be increased by the film 111 stuck onto the array of optical fibers 102. Or when the film 111 is slit at regular intervals after the optical fibers 102 are integrated into a ribbon shape by the film 111 the optical fibers 102 can be easily separated from one another.

Although the embodiments have been described on the case where the film 111 is supplied continuously so as to be stuck onto the array of optical fibers 102, the invention may be also applied to the case where the film 111 with a predetermined width is supplied intermittently so as to be stuck onto the array of optical fibers 102 at regular intervals with respect to the lengthwise direction.

The material, shape, size, form, number, arrangement place, etc. exemplified in the embodiments are optional and not limited if the invention can be achieved.

Incidentally, the above-mentioned terminal portion structure of linear elements assembled into a ribbon shape according to the invention is not limited to the aforementioned embodiments. Appropriate modifications and improvements can be made. For example, the above-mentioned tool for assembling linear elements into a ribbon shape can be used as an apparatus for producing a terminal portion structure of linear elements assembled into a ribbon shape. Furthermore, in the foregoing description of the aforementioned embodiments, it has been described that the optical fibers are employed as the linear elements. However, the linear elements are not limited to optical fibers. The invention can be applied to electric wires and cords.

INDUSTRIAL APPLICABILITY

As described above, according to the tool for assembling the linear elements into a ribbon shape according to the invention, the positioning of a plurality of linear elements is performed by a pair of position regulating members. Then, the pair of position regulating members are moved along the guide member in such a way as to have a predetermined distance therebetween. The ribbon support member is interposed between the pair of position regulating members, and supports the linear elements to which the ribbon construction material is supplied. Then, ribbon construction is performed. Thus, the linear elements can be easily integrated and assembled into a ribbon shape having a predetermined length.

Further, as described above, in the terminal portion structure of linear elements assembled in to a ribbon shape according to the invention, an adhesive tape including a film and an adhesive layer is stuck and fixed onto an array of optical fibers by the adhesive layer in the condition that terminal portions of the optical fibers are positioned so as to be disposed in parallel. Accordingly, the optical fibers can be fixed to proper positions respectively. For this reason, when coatings need to be removed from a terminal portion of the linear elements assembled in to a ribbon shape by a remover, the coatings can be removed together with the film easily without damage of the optical fibers. Accordingly, a connector can be easily attached to the terminal portion of the linear elements assembled into a ribbon shape. In addition, the array of optical fibers in the linear elements assembled into a ribbon shape can be fusion-spliced to the other array of optical fibers respectively.

The invention claimed is:

1. A tool for assembling a plurality of linear elements into a ribbon shape by a ribbon construction material, comprising:
   a pair of regulating members enabled to regulate positions, each of the regulating members has a plurality of positioning grooves for positioning said plurality of linear elements;
   a guide member supporting each of said pair of regulating members, and enabling said pair of regulating members to perform relative movement in a longitudinal direction of the linear elements; and
   a ribbon support member enabled to be placed between said pair of regulating members, the ribbon support member having a base portion and a supporting surface on which optical fibers are supported,
   wherein the supporting surface is flat or convex-shaped, and
   an interval, at which the plurality of positioning grooves formed in one of said pair of regulating members, differs from an interval at which the plurality of positioning grooves formed in the other one of said pair of regulating members.

2. A method for assembling a plurality of linear elements into a ribbon shape by a ribbon construction material, comprising the steps of:
   aligning and positioning said plurality of linear elements with a pair of position regulating members enabled to regulate positions wherein each of the regulating members has a plurality of positioning grooves for positioning the plurality of linear elements;
   performing relative movement of said pair of position regulating members in a longitudinal direction of the linear elements along a guide member which supports said pair of position regulating members;
   placing a ribbon support member, having a base portion and a flat or convex-shaped supporting surface on which optical fibers are supported, between said pair of position regulating members;
   supplying said ribbon construction material to said plurality of linear elements, wherein said ribbon construction material is a film having an adhesive layer at a surface thereof for contact with said linear elements;
   fixing said plurality of linear elements integrally with said ribbon construction material; and wherein said linear elements and said ribbon construction material are fixed by pressing said ribbon construction material;
   supplying the ribbon construction material on a ribbon support member along the longitudinal direction of the plurality of linear elements;
   forming the plurality of positioning grooves in at least two groups having a distance between the at least two groups on each regulating member; and
   communicating each of the at least two groups of the plurality of positioning grooves with at least two guide members.

3. The method according to claim 2, further comprising:
   forming an interval, at which the plurality of positioning grooves formed in one of said pair of regulating members, differs from an interval at which the plurality of positioning grooves formed in the other one of said pair of regulating members.

4. A tool for assembling a plurality of linear elements into a ribbon shape by a ribbon construction material, comprising:
   a pair of regulating members enabled to regulate positions, each of the regulating members has a plurality of positioning grooves for positioning said plurality of linear elements;
   a guide member supporting each of said pair of regulating members, and enabling said pair of regulating members to perform relative movement in a longitudinal direction of the linear elements; and
   a ribbon support member enabled to be placed between said pair of regulating members, the ribbon support member having a base portion and a supporting surface on which optical fibers are supported,
   wherein the supporting surface is flat or convex-shaped,
   the plurality of positioning grooves are formed in at least two groups having a distance between the at least two groups on each regulating member, and
   each of the at least two groups of the plurality of positioning grooves communicate with at least two guide members.

* * * * *